United States Patent
Kamiya et al.

(10) Patent No.: US 9,126,575 B2
(45) Date of Patent: Sep. 8, 2015

(54) BRAKE CONTROL DEVICE

(75) Inventors: Yusuke Kamiya, Okazaki (JP);
Takahiro Okano, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/233,668

(22) PCT Filed: Jul. 19, 2011

(86) PCT No.: PCT/JP2011/066380
§ 371 (c)(1),
(2), (4) Date: Jan. 17, 2014

(87) PCT Pub. No.: WO2013/011565
PCT Pub. Date: Jan. 24, 2013

(65) Prior Publication Data
US 2014/0156161 A1    Jun. 5, 2014

(51) Int. Cl.
*B60T 13/68*    (2006.01)
*B60T 13/66*    (2006.01)
*B60T 7/04*    (2006.01)
*B60T 8/40*    (2006.01)

(52) U.S. Cl.
CPC .................. *B60T 13/686* (2013.01); *B60T 7/04* (2013.01); *B60T 8/4081* (2013.01); *B60T 13/662* (2013.01); *B60T 2270/402* (2013.01); *B60T 2270/604* (2013.01)

(58) Field of Classification Search
USPC .......................................................... 701/70
See application file for complete search history.

(56) References Cited

U.S. PATENT DOCUMENTS

| 5,611,606 | A | * | 3/1997 | Nell et al. ...................... 303/155 |
| 6,398,319 | B1 | * | 6/2002 | Wilson et al. ............ 303/122.03 |
| RE44,677 | E | * | 12/2013 | Campau et al. ............ 303/113.4 |
| 2006/0066146 | A1 | | 3/2006 | Otomo |
| 2007/0164607 | A1 | * | 7/2007 | Itoh ............................... 303/155 |
| 2008/0185241 | A1 | * | 8/2008 | Isono et al. ............... 188/151 R |

FOREIGN PATENT DOCUMENTS

| JP | 2006-123889 | 5/2006 |
| JP | 2006-219101 | 8/2006 |
| JP | 2008-265515 | 11/2008 |

OTHER PUBLICATIONS

International Search Report issued Oct. 25, 2011, in PCT/JP2011/066380, filed Jul. 19, 2011.

* cited by examiner

*Primary Examiner* — Thomas Tarcza
*Assistant Examiner* — Alex C Dunn
(74) *Attorney, Agent, or Firm* — Oblon, McClelland, Maier & Neustadt, L.L.P.

(57) ABSTRACT

When a brake ECU is started up rapidly by a brake pedal operation, the brake ECU executes a depression force fluid pressure mode. When the control pressure detected by a control pressure sensor becomes smaller than a switching determination threshold value, the brake ECU determines that an operation of returning a brake pedal is being performed, and switches the braking mode from the depression force fluid pressure mode to a normal control mode. Accordingly, even when the operation of a stroke simulator has been started, no uncomfortable feeling is given to a driver. Further, even when the operation of returning the brake pedal is not being performed, the braking mode is switched from the depression force fluid pressure mode to a simulator non-operation control fluid pressure mode when a vehicle starts to travel. Consequently, desired braking force can be rapidly generated.

16 Claims, 13 Drawing Sheets ary has already stepped in a brake pedal when the rapid startup is performed, the brake control mode is changed from a depression force fluid pressure mode

BRAKE CONTROL DEVICE

TECHNICAL FIELD

The present invention relates to a brake control device comprising a fluid pressure control circuit to transmit to a wheel cylinder by regulating fluid pressure of fluid pressurized by a power fluid pressure generator.

BACKGROUND ART

Conventionally, a brake control device is known in which a depression force fluid pressure circuit which transmitting fluid pressure of fluid pressurized by the depression force of the brake pedal to a wheel cylinder and a fluid pressure control circuit regulating fluid pressure of fluid pressurized by a power fluid pressure generator by a linear control valve and transmitting to the wheel cylinder are arranged in parallel. The brake control device usually selects a normal control mode using the fluid pressure control circuit in time and switches a braking mode to a depression force fluid pressure mode using the depression force fluid pressure circuit when some kind of abnormality is detected.

In the normal control mode, a target fluid pressure is calculated based on a demand braking force which is generated in the brake control device, and degree of opening of the linear control valve is usually controlled so that the target fluid pressure is transmitted to the wheel cylinder. Generally the brake control system without using the depression force of such a brake pedal is called brake by wire method.

In the normal control mode, a master cut valve provided in the master flow path communicating with a master cylinder and a wheel cylinder is closed, and a simulator cut valve provided in the simulator flow path communicating the master cylinder and a stroke simulator is opened. Thereby, fluid becomes able to flow out from the master cylinder to the stroke simulator by the operation of the brake pedal, and the stroke operation of the brake pedal is enabled, and the operation reaction force increasing so that quantity of stepping forward of the brake pedal becomes big is obtained.

Patent Literature 1 discloses the technique to keep on having closed a simulator cut valve after a switch of the braking mode when the braking mode before the switch is a mode closing the simulator cut valve when the braking mode is switched during the brake operation by a driver. Because the simulator cut valve is set in a closed state in a depression force fluid pressure mode, when it is usually switched from the depression force fluid pressure mode to the normal control mode, the closed state of the simulator cutoff valve is maintained. Thereby, at the time of mode switching, it is prevented what the brake pedal gets into more than the expectation of the driver.

CITATION LIST

Patent Literature

[PTL 1] JP Laid-Open Patent NO. 2008-265515

SUMMARY OF INVENTION

When an ignition switch is turned on, in the brake control device, the control system (electronic controller) starts, and the braking mode in a normal control mode is selected in the case of the absence of abnormality in the device. The brake control device adopting a rapid startup method is known in which the control system is started up when the operation of the brake pedal is carried out even if the ignition switch is at an off state. Because a driver has already stepped in a brake pedal when the rapid startup is performed, the brake control mode is changed from a depression force fluid pressure mode (state before the start) to the normal control mode on condition that the brake pedal was stepped in. Even if the braking mode is switched from depression force fluid pressure mode to the normal control mode when a technique suggested to patent literature 1 is applied to the brake control device adopting the rapid startup method, the closed state of the simulator cutoff valve is maintained. Therefore, good brake operation feeling is not provided because the brake operation is felt for a driver firmly, and good brakes operation feeling is not provided.

The present invention has been made to solve the above-mentioned problems, and is intended to improve a brake operation feeling at the rapid startup.

According to the characteristic of the invention to solve the problems, a brake control device, comprising a plurality of wheel cylinders (42) in which each wheel cylinder is provided to each of a plurality of wheels respectively and receives a fluid pressure of fluid and provides a braking force to each wheel, a depression force fluid pressure circuit (LR, LF) which transmits the fluid pressure of fluid pressurized by pedal force input into a brake pedal (10) to a plurality of wheel cylinders, a power fluid pressure generator (30) to pressurize fluid regardless of the operation of the brake pedal, a fluid pressure control circuit (LC) which regulates fluid pressure of fluid pressurized by the power fluid pressure generator and transmits fluid pressure to a plurality of wheel cylinders, a stroke simulator (70) which generates an anti-power depending on an operation quantity of the brake pedal operation and permits the brake pedal operation, an electronic control device (100) which executes a normal control mode for generating a braking force depending on the brake pedal operation quantity using the fluid pressure control circuit while operating the stroke simulator and a depression force fluid pressure mode for generating a braking force using the depression force fluid pressure circuit while stopping the stroke simulator selectively, a rapid startup means (S15) for starting the electronic control device by the brake pedal operation, further comprising a rapid startup mode switching control means (S17, S18, S16) for switching a braking mode from the depression force fluid pressure mode to the normal control mode in the middle of the returning operation of the brake pedal when the electronic control device starts by the rapid startup means.

In this case, the rapid startup mode switching control means may switch a braking mode from the depression force fluid pressure mode to the normal control mode in the case of decreasing the operation quantity of the brake pedal than a predetermined switching determination threshold value when the electronic control device started by the rapid startup means.

The brake control device according to the present invention comprises the depression force fluid pressure circuit and the fluid pressure control circuit, and the normal control mode for generating the braking force depending on the brake pedal operation quantity using the fluid pressure control circuit and the depression force fluid pressure mode for generating a braking force using the depression force fluid pressure circuit are executed selectively by the electronic control device. The depression force fluid pressure circuit transmits the fluid pressure of fluid pressurized by pedal force input into a brake pedal to a plurality of wheel cylinders. In this case, for example, the depression force fluid pressure circuit should be constructed by a depression force fluid pressure circuit for front wheels and a depression force fluid pressure circuit for rear wheels independent each other, and the fluid pressure of fluid should be transmitted to a wheel cylinder provided in the front wheel by the depression force fluid pressure circuit for front wheels and the fluid pressure of fluid should be transmitted to a wheel cylinder provided in the rear wheel by the depression force fluid pressure circuit for rear wheels.

On the other hand, the fluid pressure control circuit regulates fluid pressure of fluid pressurized by the power fluid pressure generator which pressurizes fluid regardless of the operation of the brake pedal and transmits fluid pressure to a plurality of wheel cylinders. For example, the fluid pressure transmitted the wheel cylinder should be controlled based on the brake pedal operation quantity by a linear control valve.

In the normal control mode for generating the braking force to wheels using the fluid pressure control circuit, because it is necessary to cutoff the depression force fluid pressure circuit it is not just possible to perform the brake pedal operation, and so the stroke simulator is provided. The stroke simulator generates the anti-power depending on the operation quantity of the brake pedal operation and permits the brake pedal operation. Therefore, in the normal control mode, the stroke simulators are put in an operation state. On the other hand, because the braking force is generated to wheels using the fluid pressurized by the brake pedal operation in depression force fluid pressure mode, it is not necessary to operate the stroke simulator, and so the function of the stroke simulator is stopped.

The electronic control device executes the normal control mode when troubles in the brake control device not detected and executes the depression force fluid pressure mode when some kind of troubles occur in the brake control device. Also, when electronic control device does not startup, the depression force fluid pressure circuit is formed. Note that, braking modes executed by the electronic control device are not limited to these two modes and may include other braking mode.

In an electric vehicle or a hybrid vehicle, a regenerative braking for generating the electricity to the motor by the rotational force of wheels and supplying this generation electricity to the battery by regeneration is executed as well as the brake control by the fluid pressure. When such a regenerative braking is executed, it is possible to generate the appropriate braking force to wheels by setting a braking force except the braking force by regeneration from the total braking force as a braking force by the fluid pressure. Therefore, the normal control mode is preferred when a so-called regenerative cooperation brake control is executed by the combination with this t normal control mode and the regenerative braking.

Generally the control system in the brake control device starts when the ignition switch is turned on, but in the present invention even if the ignition switch is in condition not to be turned on, the rapid startup means starts the electronic control device by the brake pedal operation.

Because the depression force fluid pressure circuit is formed before starting of the electronic control device, the braking mode is switched from the depression force fluid pressure mode to the normal control mode on condition that brake pedal is stepped in, when the electronic control device starts (referred to as the rapid startup) by the rapid startup means. Because the operation of the stroke simulator is started at this mode switching, at the rapid startup, the mode switching timing greatly influences the operation feeling of the brake pedal.

Thus, according to the present invention, the rapid startup mode switching control means is provided. The rapid startup mode switching control means switches a braking mode from the depression force fluid pressure mode to the normal control mode in the middle of the returning operation of the brake pedal when the electronic control device starts by the rapid startup. That is, when the electronic control device starts at the rapid startup, the depression force fluid pressure mode is continued until the returning operation of the brake pedal is carried out, and the braking mode is switched to the control mode in the middle of the returning operation.

Thereby, when the operation of the stroke simulator is started, because when the operation of the stroke simulator is started, the depression force generated by stepping forward of the brake pedal by a driver decreases, it is hard to give the driver uncomfortable feeling. Therefore, according to the present invention, brake operation feeling at the rapid startup can be improved.

Also, the rapid startup mode switching control means may switch a braking mode from the depression force fluid pressure mode to the normal control mode when the operation quantity of the brake pedal decreases than a predetermined switching determination threshold value. For example, the quantity of the brake pedal operation is detectable based on the pedal stroke or fluid pressure (it is referred to as a depression force fluid pressure) of fluid pressurized by the depression force. Therefore, for example, when the pedal stroke became smaller than a predetermined returning determination threshold value or when the depression force fluid pressure became smaller than a predetermined returning determination threshold value, It is judged that there is in the middle of the returning operation of the brake pedal, and it is possible to switch the braking mode from depression force fluid pressure mode to the normal control mode. Thereby, according to the present invention, a mode switching timing can be set further appropriately, and the brake operation feeling at the rapid startup can further be improved.

According to another characteristic of the invention, the brake control device further comprises a simulator non-operation control fluid pressure mode executing means (S19, S20) to execute a simulator non-operation control fluid pressure mode for generating a braking force using the fluid pressure control circuit in the state of stopping the function of the stroke simulator when a predetermined control fluid pressure requirement condition is satisfied even if the returning operation of the brake pedal is not carried out after starting the electronic control device by the rapid startup means.

In this case, the control fluid pressure requirement condition may be a condition in which vehicle speed is beyond a predetermined setting speed.

In the present invention, the simulator non-operation control fluid pressure mode executing means executes the simulator non-operation control fluid pressure mode for generating a braking force using the fluid pressure control circuit in the state of stopping the function of the stroke simulator when a predetermined control fluid pressure requirement condition is satisfied even if the returning operation of the brake pedal is not carried out, for example, even if the operation quantity of the brake pedal does not decrease than a predetermined switching determination threshold value.

For example, the wheel braking using the fluid pressure control circuits like as the regenerative cooperation brake control may be required when the vehicle begins to run under the influence of paths of slope incline, even if the brake pedal is stepped by the rapid startup. In this case, the simulator non-operation control fluid pressure mode should be executed when it is detected that the vehicle speed is beyond a predetermined setting speed. Therefore, according to the present invention, a desired braking force can be generated immediately when the wheel braking using the fluid pressure control circuit is required.

According to another characteristic of the invention, the brake control device further comprises a target breaking force calculation means (S41-S54) which calculates a correction quantity for correcting of relations with a brake pedal operation quantity and a target breaking force after the switch to the normal control mode based on a real braking force generated by the depression force fluid pressure circuit in the case of switching the braking mode from the depression force fluid pressure mode to the normal control mode, and calculates the target breaking force based on the correction quantity.

In the depression force fluid pressure mode, relations with the brake pedal operation quantity and the braking force are unequivocally decided by machine constitution, but in the normal control mode, the target braking force depending on the brake pedal operation quantity can be set freely because the fluid pressure of fluid pressurized by the power fluid pressure generator is regulated and is transmitted to wheel cylinders. The electronic control device stores relations with the brake pedal operation quantity and the braking force for executing the normal control mode, and calculates the target braking force from the brake pedal operation quantity based on these relations in the normal control mode and regulates fluid pressure so that this target braking force is generated. Therefore, bigger braking force can be generated in a small stroke in the normal control mode in comparison with in the depression force fluid pressure mode. If relations with the brake pedal operation quantity and the braking force in the case of the depression force fluid pressure mode are different from such relations in the normal control mode, the braking force changes at the time of mode switching.

Thus, according to the present invention, the target breaking force calculation means is provided. The target breaking force calculation means calculates a correction quantity for correcting of relations with the brake pedal operation quantity and the target breaking force based on the real braking force generated by the depression force fluid pressure circuit in the case of switching the braking mode from the depression force fluid pressure mode to the normal control mode, and calculates the target breaking force based on the correction quantity. For example, if a real braking force generated by the depression force fluid pressure circuit is understood, a brake pedal operation quantity required to generate the real braking force can be demanded about each with the depression force fluid pressure mode and the normal control mode. If the correction quantity is set based on a difference of brake pedal operation the quantity in each mode, relations with the brake pedal operation quantity and the target breaking force can be changed. The target breaking force calculation means calculates the target breaking force of the normal control mode based on this correction quantity. For example, by correcting the brake pedal operation quantity, braking force can be generated in the normal control mode with the characteristic (brake pedal operation–braking force) that is similar to the characteristic in the depression force fluid pressure mode.

Therefore, according to the present invention, it is possible to restrain the change of the braking force at the time of mode switching.

According to another characteristic of the invention, the target breaking force calculation means corrects the brake pedal operation quantity using the correction quantity and comprises a correction quantity update means (S53, S55) for updating the correction quantity so that the corrected brake pedal operation quantity is not smaller than a predetermined lower limit value.

When relations with the brake pedal operation quantity and the target breaking force are set so that bigger braking force can be generated in a small stroke in the normal control mode in comparison with in the depression force fluid pressure mode, corrected brake pedal operation quantity becomes small in comparison with the real brake pedal operation quantity by correcting the brake pedal operation quantity. Therefore, the brake pedal operation quantity corrected in the middle of the returning operation of the brake pedal may be smaller than an operation quantity range (e.g., a stroke range) of the brake pedal. In this case, then when the brake pedal is stepped in, the startup of the braking force is late, because the braking force is generated after the operation quantity range contained corrected brake pedal operation quantity.

Thus, in the present invention, the correction quantity update means updates the correction quantity so that the corrected brake pedal operation quantity is not smaller than the predetermined lower limit value. Thereby, it is possible to prevent generation of the braking force from being late to the brake pedal operation.

According to another characteristic of the invention, the stroke simulator is connected to a simulator flow path (71) branched from a point of the power fluid pressure generator (22) side of the fluid pressure control circuit than a depression force cutoff valve (65) for opening and closing the fluid pressure control circuit and introduces fluid of the quantity depending on the brake pedal operation quantity and generates the anti-power on condition that a simulator opening and closing valve (72) provided in the simulator flow path is at an opened state, and comprises a valve operation timing setting means (S32, S33) for opening the simulator opening and closing valve on condition that a valve (65) provided in a point of the wheel cylinder side of the fluid pressure control circuit than the branch point of the simulator flow path is at a closed state in the case of switching the braking mode from the depression force fluid pressure mode to the normal control mode.

In accordance with the present invention, in the depression force fluid pressure mode, the depression force cutoff valve provided in the depression force fluid pressure circuit is set at an opened state, and the simulator opening and closing valve provided in the simulator flow path is set at a closed state. Thereby, the function of the stroke simulator is stopped. On the other hand, the depression force cutoff valve is set at a closed state, and the simulator opening and closing valve is set at an opened state in the normal control mode. Thereby, the stroke simulator introduces fluid of the quantity depending on the brake operation quantity and generates the anti-power. When the braking mode is switched from the depression force fluid pressure mode to the normal control mode, in the case the simulator opening and closing valve is opened before closing the depression force cutoff valve, fluid introduced into wheel cylinders flows into the stroke simulator and the sound by the inflow of fluid might be generated.

Thus, in the present invention, the valve operation timing setting means opens the simulator opening and closing valve on condition that the valve provided in a point of the wheel cylinder side of the fluid pressure control circuit than the branch point of the simulator flow path is at a closed state in the case of switching the braking mode from the depression force fluid pressure mode to the normal control mode. For example, the simulator opening and closing valve is opened after closing the depression force cutoff valve. Thereby, it is possible to reduce the generation of the sound by the inflow of fluid at the time of the opening of the simulator opening and closing valve.

Note that, in the above-mentioned explanation, the constitution of the invention corresponding to the embodiment is described using a reference sign placed between brackets, but each constituent features of the invention is not limited to the embodiment prescribed using the reference sign.

DESCRIPTION OF EMBODIMENTS

Figure 1:
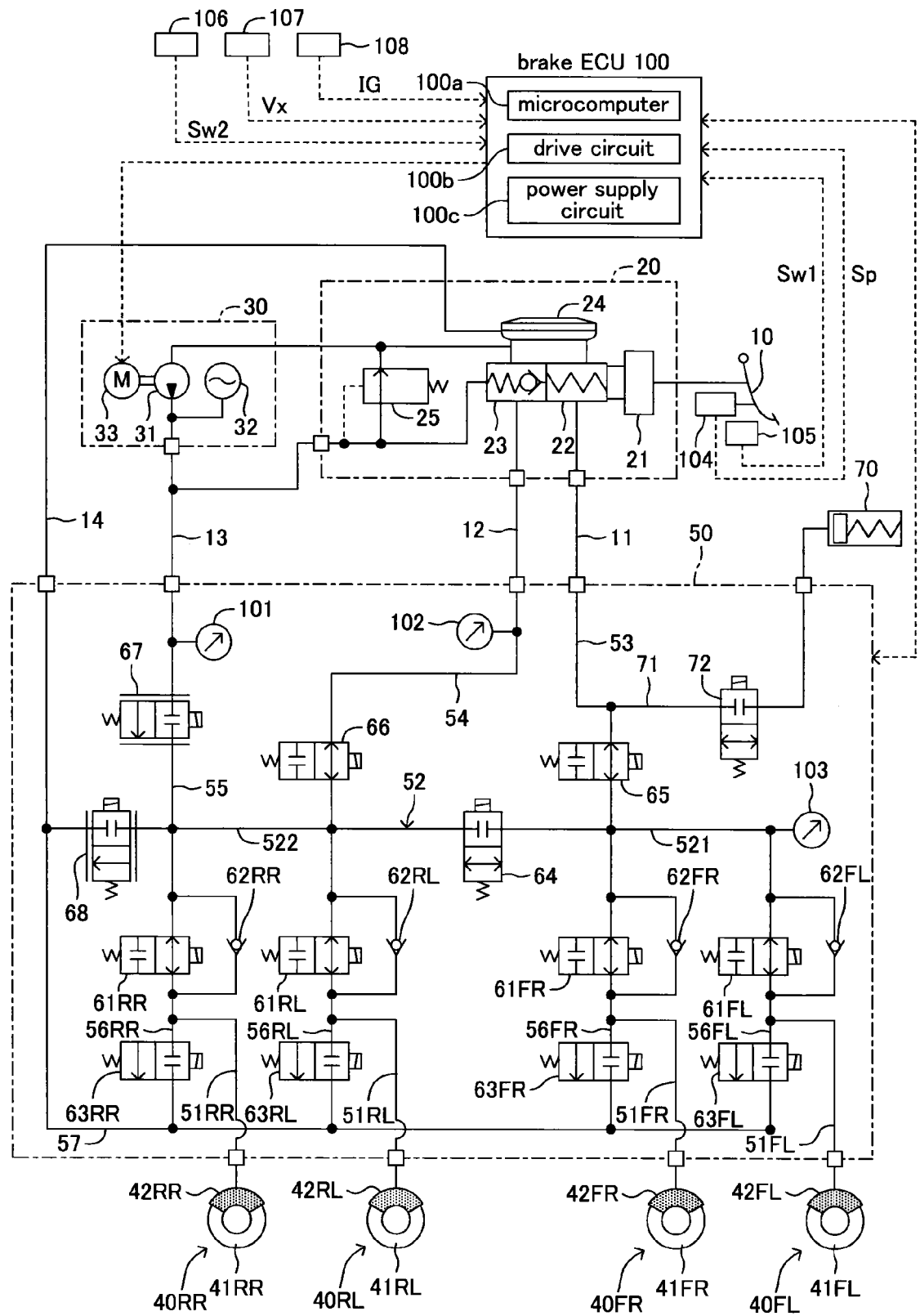
FIG. 1 is a figure which shows the illustration of outline system constitution of a brake control device concerning an embodiment of the present invention.

A brake control device concerning one embodiment of the present invention is described below with reference to the drawings. FIG. 1 is a figure which shows the illustration of outline system constitution of a brake control device concerning an embodiment of the present invention.

The brake control device of the present embodiment comprises a brake pedal 10, a master cylinder unit 20, a power fluid pressure generator 30, a fluid pressure control valve device 50, disc brake units 40FR, 40FL, 40RR, 40RL provide to each wheel, and a brake ECU 100 performing brake control. Disc brake units 40FR, 40FL, 40RR, 40RL comprise brake disks 41FR, 41FL, 41RR, 41RL and wheel cylinders 42FR, 42FL, 42RR, 42RL built-in to a brake caliper. Note that, about the element provided in response to each wheel, a sign FR is referred to the end of the reference sign of the element about the right front wheel, and a sign FL is referred to the end of the reference sign of the element about the left front wheel, and a sign RR is referred to the end of the reference sign of the element about the right rear wheel, and a sign RL is referred to the end of the reference sign of the element about the left rear wheel. On the other hand, such sign should be omitted when a wheel position is not pinpointed in the following.

Wheel cylinders 42FR, 42FL, 42RR, 42RL are connected to a fluid pressure control valve device 50, and press a braking pad against brake disks 41FR, 41FL, 41RR, 41RL rotating with a wheel by fluid pressure of working fluid (brake fluid) supplied from the fluid pressure control valve device 50 and give braking force to the wheel.

A master cylinder unit 20 comprises a fluid pressure booster 21, a master cylinder 22, a regulator 23 and a reservoir 24. The fluid pressure booster 21 is connected to the brake pedal 10 and amplifies pedal depression force added to the brake pedal 10 and introduces amplified force into the master cylinder 22. The fluid pressure booster 21 amplifies pedal depression force and introduces amplified force into the master cylinder 22 by supply of fluid (working fluid) from the power fluid pressure generator 30 via the regulator 23. The master cylinder 22 generates master cylinder pressure having the predetermined boost ratio to pedal depression force.

The reservoir 24 to storage fluid is provided at the upper part of the master cylinder 22 and the regulator 23. The master cylinder 22 communicates with the reservoir 24 when the stepping forward operation of the brake pedal 10 is canceled. The regulator 23 communicates with both the reservoir 24 and an accumulator 32 of the power fluid pressure generator 30, and generates fluid pressure approximately equal to master cylinder pressure in the state that the reservoir 24 is assumed a low-pressure source, and the accumulator 32 is assumed a high pressure source. As follows, fluid pressure in the regulator 23 is referred to as regulator pressure. Note that, it is not necessary to set in equivalence with master cylinder pressure and regulator pressure closely and, for example, it may be set that regulator pressure become the high pressure slightly than master cylinder pressure.

The power fluid pressure generator 30 is a power fluid pressure source and comprises a pump 31 and the accumulator 32. The pump 31 is configured that its suction port is connected to the reservoir 24, and its discharge port is connected to the accumulator 32, and the pump 31 pressurizes fluid by driving a motor 33. The accumulator 32 converts pressure force energy of fluid pressurized by the pump 31 into pressure force energy of enclosure gas such as nitrogen and storages. Further, the accumulator 32 is connected to a relief valve 25 provided with the master cylinder unit 20. When pressure force of fluid abnormally increases, the relief valve 25 is closed down and returns fluid to the reservoir 24.

Thus, the brake control device comprises the master cylinder 22 using the brakes depression force (power to step with the brake pedal 10) by a driver as fluid pressure source giving fluid pressure of the to the wheel cylinder 42, the regulator 23, and the power fluid pressure generator 30 giving fluid pressure regardless of the brake depression force by the driver The master cylinder 22, the regulator 23, the power fluid pressure generator 30 are connected to the fluid pressure control valve device 50 through a master piping 11, a regulator piping 12, and an accumulator piping 13, respectively. Further, the reservoir 24 is connected to the fluid pressure control valve device 50 through a reservoir piping 14.

The fluid pressure control valve device 50 comprises four individual flow path 51FR, 51FL, 51RR, 51RL which are connected to each wheel cylinder 42FR, 42FL, 42RR, 42RL, a main flow path 52 communicating with individual flow paths 51FR, 51FL, 51RR, 51RL, a master flow path 53 to connect the master piping 11 to the main flow path 52, a regulator flow path 54 to connect the regulator piping 12 to the main flow path 52, an accumulator flow path 55 to connect the accumulator piping 13 to the main flow path 52. The master flow path 53 and the regulator flow path 54 and the accumulator flow path 55 are connected to the main flow path 52 in parallel.

ABS holding valves 61FR, 61FL, 61RR, 61RL is provided in the middle of each flow path 51FR, 51FL, 51RR, 51RL, respectively. The ABS holding valve 61 is a normal time opening type solenoid-actuated valve to maintain open position by the biasing force of the spring at the time of the non-electricity of the solenoid, and to be set a closed state only while the solenoid is energized. The ABS holding valve 61 can bi-directionally drain fluid in the open position, and does not have directionality.

Further, return check valves 62FR, 62FL, 62RR, 62RL are provided with each flow path 51FR, 51FL, 51RR, 51RL in parallel with ABS holding valves 61FR, 61FL, 61RR, 61RL. The return check valve 62 is a valve which interrupts flow of fluid toward the wheel cylinder 42 from the main flow path 52 and permits flow of fluid toward the main flow path 52 from the wheel cylinder 42. That is, when fluid pressure (it is referred to as wheel cylinder pressure) of the wheel cylinder 42 becomes the high pressure than fluid pressure of the main flow path 52, a valve disc opens mechanically and drains fluid of the wheel cylinder 42 into the main flow path 52 side, and the valve disc closes when wheel cylinder pressure equals fluid pressure of the main flow path 52. Therefore, when control fluid pressure in the main flow path 52 decreases, and is smaller than wheel cylinder pressure when the ABS holding valve 61 is closed, and wheel cylinder pressure is maintained, wheel cylinder pressure can be lowered until control fluid pressure of the main flow path 52 with maintaining the ABS holding valve 61 at a closed state.

Also, pressure reducing individual flow paths 56FR, 56FL, 56RR, 56RL is connected to each flow path 51FR, 51FL, 51RR, 51RL, respectively. The individual flow path 56 for each decompression is connected to a reservoir flow path 57. The reservoir flow path 57 is connected to the reservoir 24 through the reservoir piping 14. ABS pressure reducing valves 63FR, 63FL, 63RR, 63RL is provided in the middle of each pressure reducing individual flow path 56FR, 56FL, 56RR, 56RL, respectively. Each ABS pressure reducing valve 63 is a normal time closing type solenoid-actuated valve maintained at a closed state by the biasing force of the spring at the time of the non-electricity of the solenoid, and to be set an opened state only while the solenoid is energized. Each ABS pressure reducing valve 63 reduces wheel cylinder pressure by spreading fluid in the reservoir flow path 57 through the pressure reducing individual flow path 56 from the wheel cylinder 42 in an open condition.

The ABS holding valve 61 and the ABS pressure reducing valve 63 are "open/close" controlled at the time of the operation of the antilock brakes control to lower the wheel cylinder pressure when the wheel locks and skidded, and to prevent wheel lockup.

A communicating valve 64 is provided in the middle of the main flow path 52. The communicating valve 64 is a normal time closing type solenoid-actuated valve maintained at a closed state by the biasing force of the spring at the time of the non-electricity of the solenoid, and to be set an opened state only while the solenoid is energized. The main flow path 52 is divided to a first main flow path 521 connecting to the master flow path 53 and a second main flow path 522 connecting to the regulator flow path 54 and the accumulator flow path 55 via the communicating valve 64 as boundary. When the communicating valve 64 is a closed state, flow of fluid between the first main flow path 521 and the second main flow path 522 is interrupted, and when the communicating valve 64 is an opened state, interactive flow of fluid between the first main flow path 521 and the second main flow path 522 is permitted.

A master cut valve 65 is provided in the middle of the master flow path 53. The master cut valve 65 is a normal time opening type solenoid-actuated valve to maintain open position by the biasing force of the spring at the time of the non-electricity of the solenoid, and to be set a closed state only while the solenoid is energized. When the master cut valve 65 is a closed state, flow of fluid between the master cylinder 22 and the first main flow path 521 is interrupted, and when the master cut valve 65 is an opened state, interactive flow of fluid between the master cylinder 22 and the first main flow path 521 is permitted.

The master flow path 53 comprises a simulator flow path 71 to diverge from the master cylinder 22 side than a position provided with the master cut valve 65 in the master flow path. A stroke simulator 70 is connected to the simulator flow path 71 through a simulator cut valve 72. The simulator cut valve 72 is a normal time closing type solenoid-actuated valve maintained at a closed state by the biasing force of the spring at the time of the non-electricity of the solenoid, and to be set an opened state only while the solenoid is energized. When the simulator cut valve 72 is a closed state, flow of fluid between the master flow path 53 and the stroke simulator 70 is interrupted, and when the simulator cut valve 72 is an opened state, interactive flow of fluid between the master flow path 53 and the stroke simulator 70 is permitted.

The stroke simulator 70 comprises a plurality of pistons and springs and enables stroke operation of the brake pedal 10 by introducing fluid of the quantity depending on the brake pedal operation quantity inside and does the brake operation feeling of the driver well by generating anti-power depending on the quantity of the pedal operation when the simulator cut valve 72 is an opened state.

A regulator cut valve 66 is provided in the middle of the regulator flow path 54. The regulator cut valve 66 is a normal time opening type solenoid-actuated valve to maintain open position by the biasing force of the spring at the time of the non-electricity of the solenoid, and to be set a closed state only while the solenoid is energized. When the regulator cut valve 66 is a closed state, flow of fluid between the regulator 23 and the second main flow path 522 is interrupted, and when the regulator cut valve 66 is an opened state, interactive flow of fluid between the regulator 23 and the second main flow path 522 is permitted.

A booster linear control valve 67 is provided in the middle of the accumulator flow path 55. Also, the second main flow path 522 connecting to the accumulator flow path 55 is connected to the reservoir flow path 57 through a pressure reducing linear control valve 68. The booster linear control valve 67 and the pressure reducing linear control valve 68 are a normal time closing type solenoid-actuated valve maintained at a closed state by the biasing force of the spring at the time of the non-electricity of the solenoid, and to increase degree of opening according to increase of the electricity quantity (current value) to the solenoid. The booster linear control valve 67 and the pressure reducing linear control valve 68 maintained at a closed state by the shut valve power which is a difference between the power to bias the valve disc by a spring in the closing direction and the power to bias the valve disc by the differential pressure of primary (the entrance side) and the secondary side (outlet side) to the opening direction, and make the valve disc open at the degree of opening that responded to balance of the power to work to the valve disc. Therefore, degree of opening can be adjusted by controlling quantity of the electricity to the solenoid (current value).

The power fluid pressure generator 30 and the fluid pressure control valve device 50 are controlled by the brake ECU 100. The brake ECU 100 contains a microcomputer 100a comprising CPU, RAM, ROM, the input and output interface, and the like, a drive circuit 100b comprising a pump drive circuit, an electromagnetic valve drive circuit, a sensor drive circuit, and the like, a power supply circuit 100c which supplies electricity to the microcomputer 100*a* and the drive circuit 100*b* from in-vehicle battery (not shown in figures). The electromagnetic opening and closing valve and the electromagnetic linear control valve provided in the fluid pressure control valve device 50 are connected all to the brake ECU 100 are controlled according to the opening and closing state and the degree of opening (in the case of the electromagnetic linear control valve) by the solenoid drive signal output by the drive circuit 100*b*. Further, the motor 33 provided in the power fluid pressure generator 30 is also connected to the brake ECU 100 and is controlled by the motor drive signal output by the drive circuit 100*b*.

The fluid pressure control valve device 50 comprises an accumulator pressure sensor 101, a regulator pressure sensor 102 and a control pressure sensor 103. The accumulator pressure sensor 101 detects accumulator pressure Pacc which is a pressure of fluid in the part of the power fluid pressure generator 30 side (upstream) than the booster linear control valve 67 in the accumulator flow path 55. The accumulator pressure sensor 101 outputs a signal representing detected accumulator pressure Pacc to the microcomputer 100*a* of the brake ECU 100. The regulator pressure sensor 102 detects regulator pressure Preg which is a pressure of fluid in the part of the regulator 23 side (upstream) than the regulator cut valve 66 in the regulator flow path 54. The regulator pressure sensor 102 outputs a signal representing detected regulator pressure Preg to the microcomputer 100*a* of the brake ECU 100. The control pressure sensor 103 outputs a signal representing control pressure Pcon which is a pressure of fluid in the first main flow path 521 to the microcomputer 100*a* of the brake ECU 100.

Further, a pedal stroke sensor 104, and a pedal switch 105, and a courtesy switch 106, and a vehicle speed sensor 107 and an ignition switch 108 are connected to the brake ECU 100. The pedal stroke sensor 104 detects the pedal stroke which is quantity of stepping forward of brake pedal 10 (operation quantity) and outputs a signal representing detected pedal stroke Sp to the microcomputer 100*a* of the brake ECU 100. The pedal switch 105 is a switch to make a stop lamp not shown in figures turn on when it was stepped into the set position, and outputs a signal (it is referred to as pedal switch signal Sw1) representing switch status Sw1 to the microcomputer 100*a* of the brake ECU 100. This pedal switch signal Sw1 is used as the trigger of startup rapidly (the rapid startup) to be described below. The courtesy switch 106 is a switch supplying a signal depending on the opening and closing state of the door of the vehicle, and outputs a signal (it is referred to as door switch signal Sw2) representing switch status Sw2 to the microcomputer 100*a* of the brake ECU 100. The vehicle speed sensor 107 outputs a signal representing vehicle speed Vx to the microcomputer 100*a* of the brake ECU 100. The ignition switch 108 outputs an ignition signal IG to start the vehicle to various ECU in the vehicle. This ignition signal is also input to the microcomputer 100*a* of the brake ECU 100.

Then, performed brake control by the brake ECU 100 is described. In this embodiment, at least two braking mode with a normal control mode and a depression force fluid pressure mode are usually set basically, and the brake ECU 100 switches these braking mode. Also, it is described below, but when a control fluid pressure requirement is established during execution of the depression force fluid pressure mode at the rapid startup, a simulator non-operation control fluid pressure mode is executed.

A vehicle having the brake control device of the present embodiment is a hybrid vehicle comprises a motor driven by a battery power supply and an internal combustion engine driven by gasoline fuel. In the hybrid vehicle, a regenerative braking is executed so as to obtain a braking force by generating the electricity to the motor by the rotational force of wheels and supplying this generation electricity to the battery by regeneration. When such a regenerative braking is executed, a regenerative cooperation brake control using both the regenerative braking and the fluid pressure braking can be performed by generating a braking force except the braking force by regeneration from a total braking force which is necessary for braking of the vehicle in the brake control device.

The regenerative cooperation brake control is usually performed in the normal control mode. In the normal control mode, the depression force generated at depressing the brake pedal 10 by the driver is only used for detecting the brake pedal operation quantity and is not transmitted to the wheel cylinder 42, the fluid pressure output from the power fluid pressure generator 30 is regulated by linear control valves 67, 68 and is transmitted to the wheel cylinder 42. On the other hand, the depression force fluid pressure mode is the braking mode which is executed when some kind of abnormality occurs in the brake control device, and fluid pressure pressurized by the brake pedal depression force is transmitted to the wheel cylinder 42. The brake ECU 100 usually switches between the normal control mode and the depression force fluid pressure mode by switching the flow path of fluid by the fluid pressure control valve device 50. Note that, the normal control mode is the braking mode which is executed when the abnormality is not detected, and it is not usually essential to perform the regenerative cooperation brake control.

In the normal control mode, the master cut valve 65 and the regulator cut valve 66 are maintained at a closed state by the electricity to the solenoid, and the communicating valve 64 and the simulator cut valve 72 are usually maintained at an opened state by the electricity to the solenoid. Also, the booster linear control valve 67 and the pressure reducing linear control valve 68 are controlled according to the degree of opening that responded to electricity quantity on condition that the electricity of the solenoid is controlled. Also, in the case of antilock brakes control, the ABS holding valve 61 and the ABS pressure reducing valve 63 may be opened and closed as needed, and usually the ABS holding valve 61 is maintained at an opened state, and the ABS pressure reducing valve 63 is maintained at a closed state.

Figure 2:
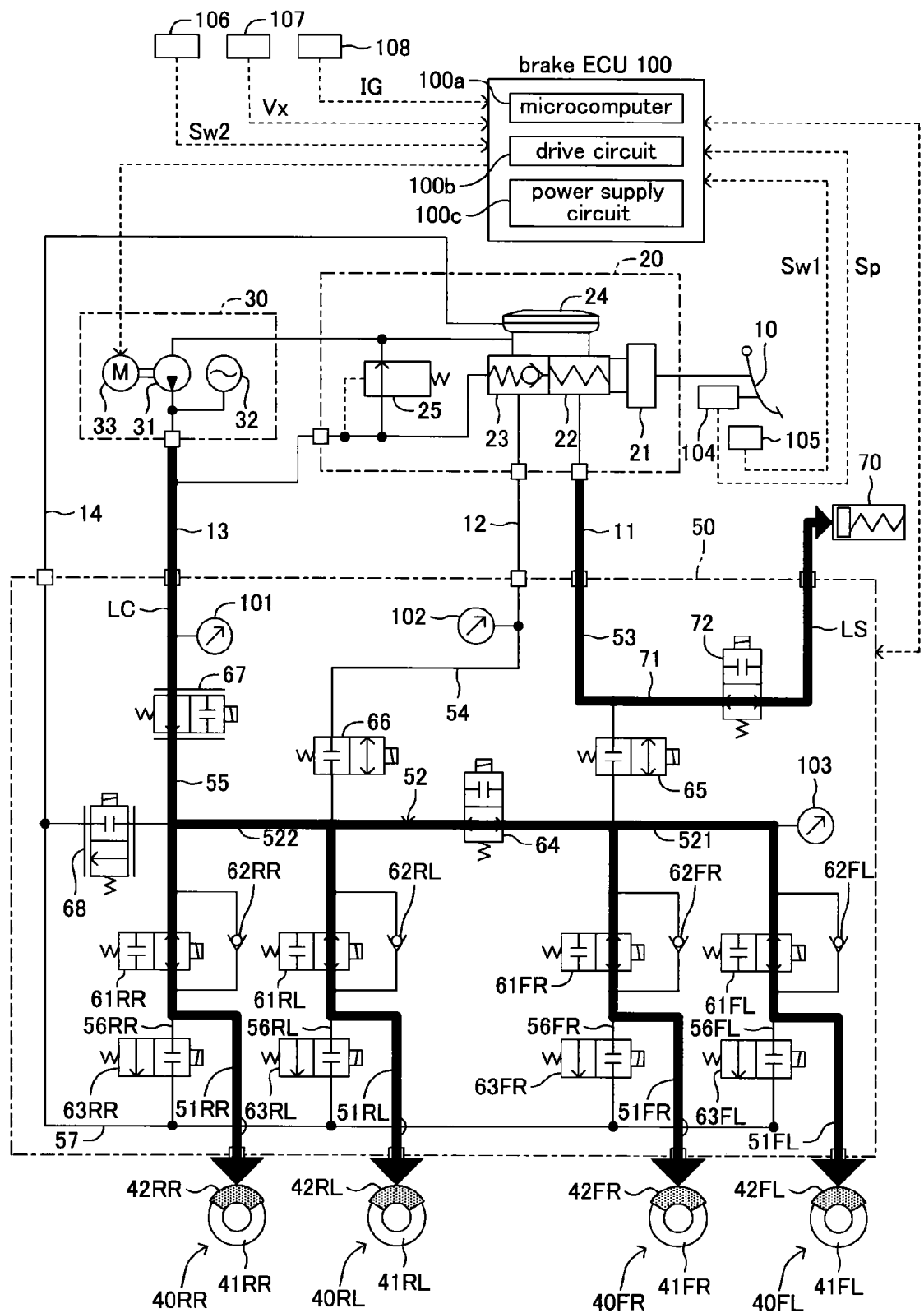
FIG. 2 is a fluid pressure circuit diagram representing a fluid pressure control circuit and a simulator fluid pressure circuit in a normal control mode.

Fluid pressure output from the master cylinder unit 20 is not usually transmitted to the wheel cylinder 42 because the master cut valve 65 and the regulator cut valve 66 are closed in the normal control mode. Also, the communicating valve 64 is maintained at an opened state and the booster linear control valve 67 and the pressure reducing linear control valve 68 become the electricity control state. Therefore, in the normal control mode, a fluid pressure control circuit LC to communicate with the power fluid pressure generator 30 and the wheel cylinder 42 of four wheels is usually formed as shown in FIG. 2. Therefore, fluid pressure (accumulator pressure) output by the power fluid pressure generator 30 is adjusted by the booster linear control valve 67 and the pressure reducing linear control valve 68 and is transmitted to the wheel cylinder 42 of four wheels. In this case, because each wheel cylinder 42 communicates with the main flow path 52, four wheel cylinder pressure becomes all the same value. This wheel cylinder pressure can be detected by the control pressure sensor 103.

Further, in the normal control mode, the brake ECU 100 usually maintains the simulator cut valve 72 at an opened state. Thereby, as shown in FIG. 2, a simulator fluid pressure circuit LS communicating with the master cylinder 22 and the stroke simulator 70 is formed. Therefore, fluid sent out from the master cylinder 22 with operation of brake pedal 10 by the driver is supplied to the stroke simulator 70 through the simulator flow path 71. Thereby, it is possible to apply the anti-power depending on the pedal depression force by the driver to the brake pedal 10 and to give the driver good pedal operation feeling.

The brake ECU 100 receives a braking demand and starts the regenerative cooperation brake control. The braking demand occurs when a braking force should be given to the vehicle, for example, when the driver performed operation to step with the brake pedal 10. The brake ECU 100 calculates (operates) a target braking force upon receipt of the braking demand based on the pedal stroke Sp detected by the pedal stroke sensor 104. The target braking force is set to a big value so that the pedal stroke Sp is big. Note that, the target braking force may be set based on the regulator pressure Preg detected by the regulator pressure sensor 102 replacing with the pedal stroke Sp and may be set based on both the pedal stroke Sp and the regulator pressure Preg.

The Brake ECU 100 transmits information to represent a calculated target braking force to a hybrid ECU (not shown in figures). The hybrid ECU calculates the braking force generated by electricity regeneration and transmits information to represent the regenerative braking force as the calculation result. Thereby, the brake ECU 100 calculates a target fluid pressure braking force that is the braking force that should be generated in the brake control device by subtracting the regenerative braking force from the target braking force. The regenerative braking force caused by electricity regeneration performed in the hybrid ECU changes by not only the rotational velocity of the motor, but also the regenerative current control changing depending on charged states (SOC) of the battery. Therefore, an appropriate target fluid pressure braking force can be calculated by subtracting the regenerative braking force from the target braking force.

The brake ECU 100 calculates a target fluid pressure of each wheel cylinder 42 based on the calculated target fluid pressure braking force, and controls driving current of both the booster linear control valve 67 and the pressure reducing linear control valve 68 by feedback control so that the wheel cylinder pressure equals the target fluid pressure. That is, electric current to drain into each solenoid of the booster linear control valve 67 and the pressure reducing linear control valve 68 can be controlled so that control pressure Pcon (=wheel cylinder pressure) detected by the control pressure sensor 103 follows the target fluid pressure.

Thereby, fluid is supplied to each wheel cylinder 42 from the power fluid pressure generator 30 through the booster linear control valve 67, and the braking force is generated to the wheel. Also, fluid is drained from the wheel cylinder 42 through the pressure reducing linear control valve 68 as needed, and the braking force to the wheel is adjusted.

Further, the brake ECU 100 reads at a prescribed a cycle accumulator pressure Pacc detected by the accumulator pressure sensor 101, when the accumulator pressure Pacc is smaller than the minimum setting pressure set beforehand, the brake ECU 100 drives the motor 33 and pressurizes the fluid by the pump 31 and controls so that the accumulator pressure Pacc is always maintained in a setting pressure range. Note that, control of this motor 33 is usually carried out in not only the normal control mode but also the depression force fluid pressure mode.

Note that, when the braking demand is not received, the brake ECU 100 usually switches the braking mode to a non-braking mode from the normal control mode. In the non-braking mode, the master cut valve 65, the regulator cut valve 66 and the communicating valve 64 are maintained all at an opened state, and the simulator cut valve 72, the booster linear control valve 67 and the pressure reducing linear control valve 68 are maintained all at a closed state.

Then, the depression force fluid pressure mode is described. In the depression force fluid pressure mode, the electricity to both the electromagnetic opening and closing valve and the electromagnetic linear control valve in the fluid pressure control valve device 50 are stopped. Therefore, the master cut valve 65 and the regulator cut valve 66 which are the normal time opening type solenoid-actuated valve are maintained at an opened state. Also, the communicating valve 64 and the simulator cut valve 72 which are the normal time closing type solenoid-actuated valve and the booster linear control valve 67 and the pressure reducing linear control valve 68 which are the normal time closing type solenoid-actuated linear valve are maintained at a closed state. Also, the ABS holding valve 61 is maintained at an opened state, and the ABS pressure reducing valve 63 is maintained at a closed state.

Figure 3:
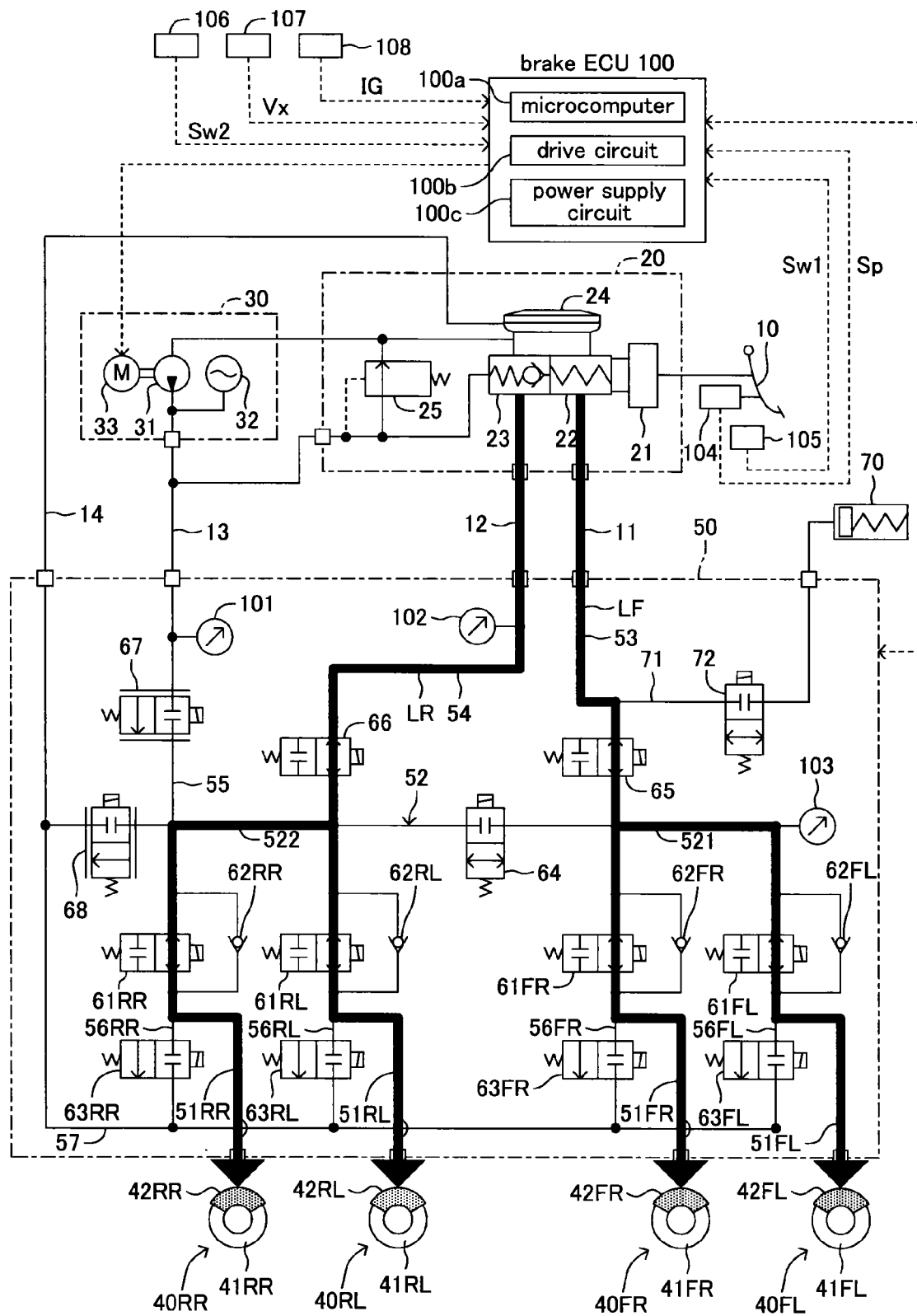
FIG. 3 is a fluid pressure circuit diagram representing a depression force fluid pressure circuit in a depression force fluid pressure mode.

Therefore, in the depression force fluid pressure mode, communication with the power fluid pressure generator 30 and each wheel cylinder 42 is interrupted, and as shown in FIG. 3, a front wheel depression force fluid pressure circuit LF communicating with the master cylinder 22 and wheel cylinders 42FR, 42FL of the front wheel and a rear wheel depression force fluid pressure circuit LR communicating with the regulator 23 and wheel cylinders 42RR, 42RL of the rear wheel are formed. Because the communicating valve 64 is maintained at a closed state, it is provided with the front wheel depression force fluid pressure circuit LF and the rear wheel depression force fluid pressure circuit LR independently each other. Therefore, master cylinder pressure is transmitted to wheel cylinders 42FR, 42FL of the front wheel, and regulator pressure is transmitted to wheel cylinders 42RR, 42RL of the rear wheel.

The depression force fluid pressure mode is the braking mode which is executed when some kind of abnormality is detected in the brake control device. Therefore, the normal control mode is usually selected at the normal (when abnormality is not detected) braking. Also, because actuating electricity is not supplied to the fluid pressure control valve device 50 on condition that the brake control device stops a system, namely the brake ECU 100 does not start, the front wheel depression force fluid pressure circuit LF and the rear wheel depression force fluid pressure circuit LR are formed same as the case of the depression force fluid pressure mode.

Figure 4:
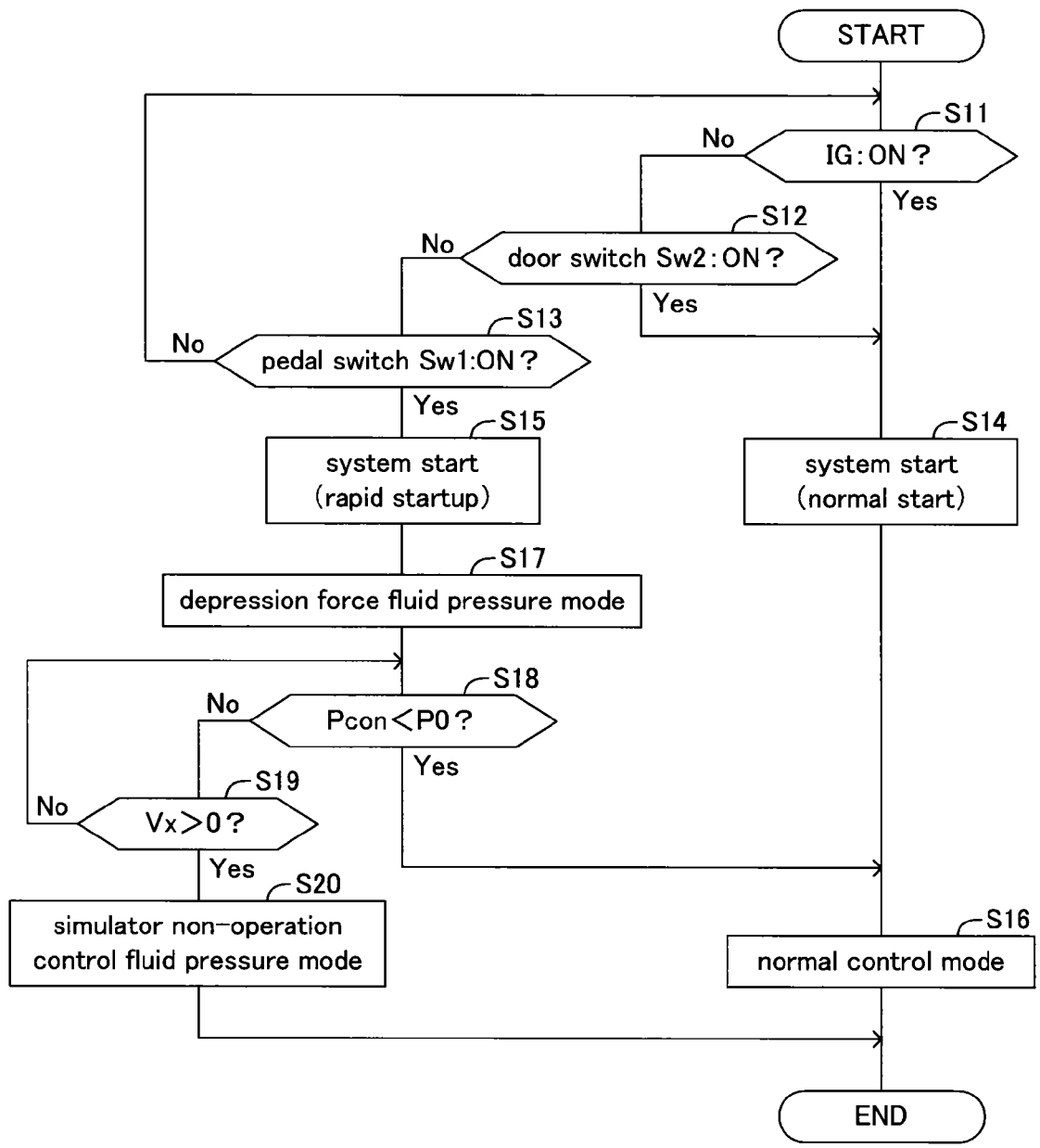
FIG. 4 is a flowchart representing a braking mode setting routine.

Then, the system start of the brake control device and setting processing of braking mode at the time of the system start are described. FIG. 4 is a flowchart representing a braking mode setting routine executed by the brake ECU 100 (microcomputer 100a). This braking mode setting routine is started from the condition that the control system does not start.

The brake ECU 100 waits until either of the ignition switch 108 and the courtesy switch 106 and the pedal switch 105 is turned on (S11-S13). That is, the brake ECU waits until the ignition switch 108 turns on, or the door of the vehicle is opened, or the brake pedal 10 is stepped. When it is put during this wait, the control system has not yet started.

When the control system does not start, the brake ECU 100 is on condition that the power supply circuit 100c stopped power supply to the microcomputer 100a and the drive circuit 100b. Therefore, when the control system does not start, because it is put in the non-electricity state, each of the electromagnetic opening and closing valve and the electromagnetic linear control valve in the fluid pressure control valve device 50 are maintained at a opened or closed state same as the case of the depression force fluid pressure mode.

When either of the ignition switch 108 and the courtesy switch 106 and the pedal switch 105 is turned on, the power supply circuit 100c of the brake ECU 100 operates, and electricity is supplied to the microcomputer 100a from the power supply circuit 100c. Thereby, the microcomputer 100a starts. After having made a predetermined primary diagnosis, the microcomputer 100a makes power supply from the power supply circuit 100c to the drive circuit 100b start. In this way, in the brake ECU 100, the control system starts (S14, S15).

The microcomputer 100a determines the opportunity of the start of the control system is the thing by the ignition switch 108 having been turned on (S11), or by the courtesy switch 106 having been turned on (S12), or by the pedal switch 105 having been turned on (S13), and sets so that a braking mode when the control system started by the ignition switch 108 or the courtesy switch 106 having been turned on (S11 or S12: Yes) is different from a braking mode when the control system started by the pedal switch 105 having been turned on (S13: Yes).

It is referred that the control system starts by the pedal switch 105 being turned on to as the rapid startup. It is usually referred that the control system starts by the ignition switch 108 or the courtesy switch 106 being turned on to as the normal start here to distinguish from the rapid startup.

The brake ECU 100 usually sets a braking mode in the normal control mode in step S16 and finishes the braking mode setting routine. In this case, because the brake pedal 10 is not stepped, then brake control with the normal control mode is usually carried out when the brake pedal 10 has been stepped.

On the other hand, at the rapid startup, the brake ECU 100 sets a braking mode in the depression force fluid pressure mode in step S17. In this case, Opening and closing state of the electromagnetic opening and closing valve and the electromagnetic linear control valve in the fluid pressure control valve device 50 is the same as a state before the start. Therefore, master cylinder pressure is transmitted to the wheel cylinders 42FR, 42FL of the front wheel, and regulator pressure is transmitted to wheel cylinders 42RR, 42RL of the rear wheel. In this case, the driver can continue the stepping forward operation of the brake pedal 10 without uncomfortable feeling.

Then subsequently, the brake ECU 100 reads control pressure Pcon detected by the control pressure sensor 103 in step S18 and determines whether this control pressure Pcon is smaller than a predetermined switching determination threshold value P0 or not. When control pressure Pcon is more than the switching determination threshold value P0 the brake ECU 100 reads vehicle speed Vx detected by the vehicle speed sensor 107 in step S19 and determines whether vehicle speed Vx is bigger than zero or not. When vehicle speed Vx is zero that is when the vehicle is stopping (S19: No), the brake ECU 100 returns the processing to step S18.

In this way, the brake ECU 100 repeats judgments in step S18 and in step S19. The switching determination threshold value P0 is set in the value that is detected when the brake pedal 10 is stepped on lightly and is set in a value bigger than control pressure Pcon when the brake pedal 10 is not stepped on. Therefore, in the middle of returning operation of the brake pedal 10, control pressure Pcon is adapted to be smaller than the switching determination threshold value P0.

When the driver relaxes the stepping forward of the brake pedal 10 after the rapid startup, and the brake pedal 10 begins to return, control pressure Pcon decreases accordingly. When it is determined that control pressure Pcon is smaller than the switching determination threshold value P0 in step S18, the brake ECU 100 can go ahead through the processing to step S16 and usually switches a braking mode to the normal control mode from the depression force fluid pressure mode. Therefore, in the middle of the returning operation of the brake pedal 10, the braking mode is usually switched to the normal control mode from the depression force fluid pressure mode.

Thereby, the front wheel depression force fluid pressure circuit LF and the rear wheel depression force fluid pressure circuit LR are cut off, and the fluid pressure control circuit LC and the simulator fluid pressure circuit LS are formed. In this way, fluid pressure (accumulator pressure) output from the power fluid pressure generator 30 is regulated by the booster linear control valve 67 and the pressure reducing linear control valve 68 and is transmitted to the wheel cylinder 42 of four wheels. Also, fluid sent out from the master cylinder 22 is supplied to the stroke simulator 70. Therefore, the brake ECU 100 can perform a braking control such as the regenerative cooperation brake control immediately from this point in time.

At this mode switching, fluid streams to the stroke simulator 70 from the master cylinder 22, but the driver is in the middle of returning the brake pedal 10, and pedal depression force decreases. Therefore, the driver is hard to feel a change of the anti-power by the operation of the stroke simulator 70 and can perform returning operation of the brake pedal 10 without uncomfortable feeling. Thereby, pedal operation feeling at the time of the switching of the braking mode can become good.

On the other hand, when vehicle speed Vx increases than zero earlier than control pressure Pcon is smaller than the switching determination threshold value P0 that is when the vehicle begins to move, the brake ECU 100 is judged with "Yes" in step S19 and can go ahead through the processing to step S20. The brake ECU 100 sets a braking mode in a simulator non-operation control fluid pressure mode in step S20.

Figure 5:
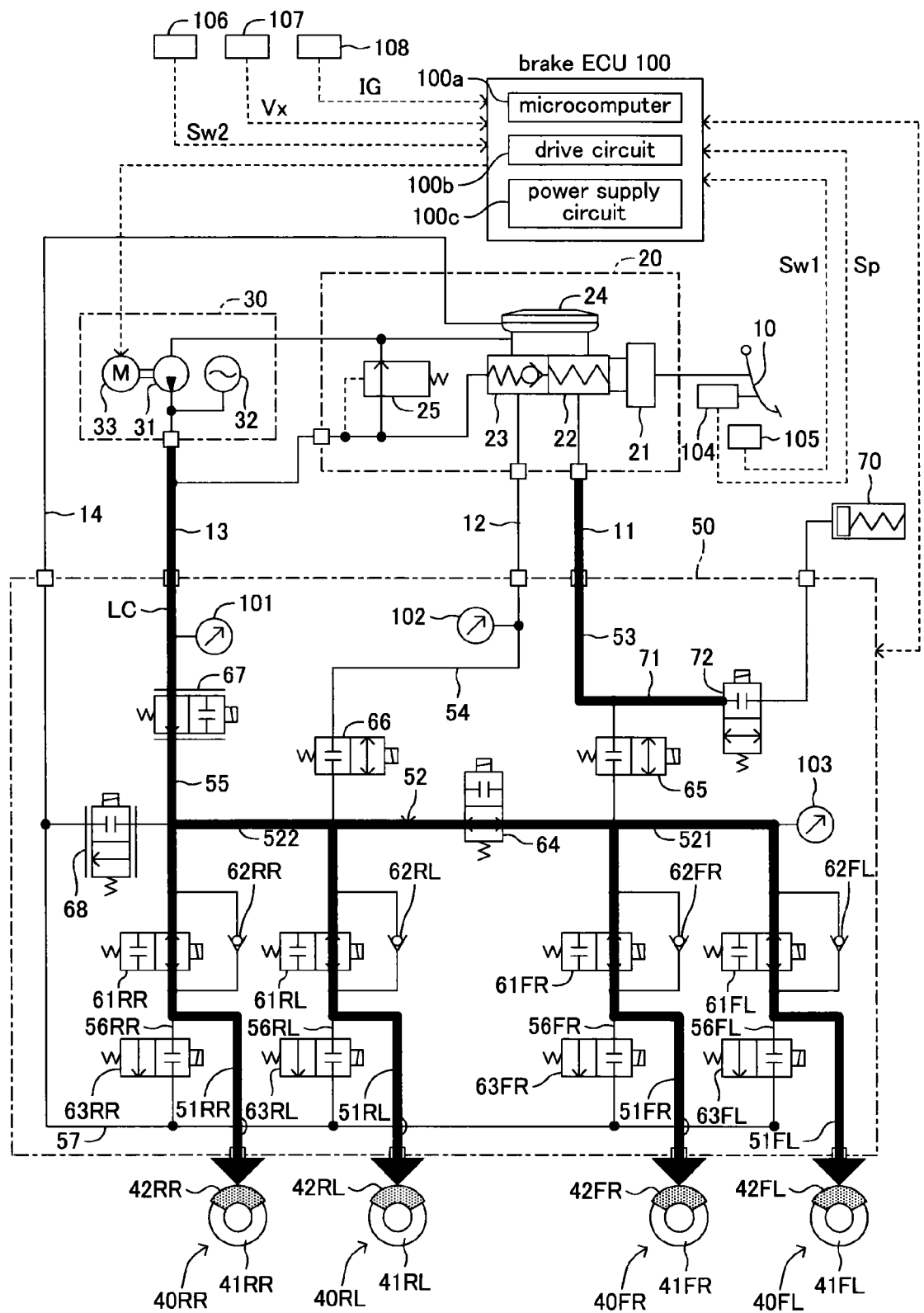
FIG. 5 is a fluid pressure circuit diagram representing the fluid pressure control circuit in a simulator non-operation control fluid pressure mode.

The simulator non-operation control fluid pressure mode is usually different from the normal control mode only in the point that the simulator cut valve 72 is maintained at a closed state. Therefore, as shown in FIG. 5, the fluid pressure control circuit LC is formed and fluid pressure output from the power fluid pressure generator 30 is regulated by the booster linear control valve 67 and the pressure reducing linear control valve 68 and is transmitted to the wheel cylinder 42 of four wheels, on the other hand, because the simulator fluid pressure circuit LS is cut off, the stroke simulator 70 becomes the non-state of operation.

For example, when the vehicle begins to run under the influence of paths of slope incline, it may be necessary to execute the regenerative cooperation brake control, the hill start assist control, even if it is on condition that the brake pedal 10 was stepped on by the rapid startup. Thus, in this embodiment, when vehicle speed Vx is beyond zero (Km/h), control fluid pressure regulated by linear control valves 67, 68 from the point in time can be conveyed to each wheel cylinder 42. Therefore, it is able to start braking control such as the regenerative cooperation brake control, the hill start assist control immediately.

In this case, because pedal force when the driver steps with the brake pedal 10 is big (Pcon≥P0), the brake pedal 10 usually further gets into the depths when the simulator cut valve 72 is left open like the normal control mode. Thus, such a trouble is prevented by maintaining the simulator cut valve 72 at a closed state in the simulator non-operation control fluid pressure mode.

When the brake ECU 100 switches the braking mode to the simulator non-operation control fluid pressure mode from the depression force fluid pressure mode in step S20, the braking mode setting routine is finished. In this case, after brake application was canceled, the brake ECU 100 usually switches the braking mode to the normal control mode from the simulator non-operation control fluid pressure mode.

Figure 6:
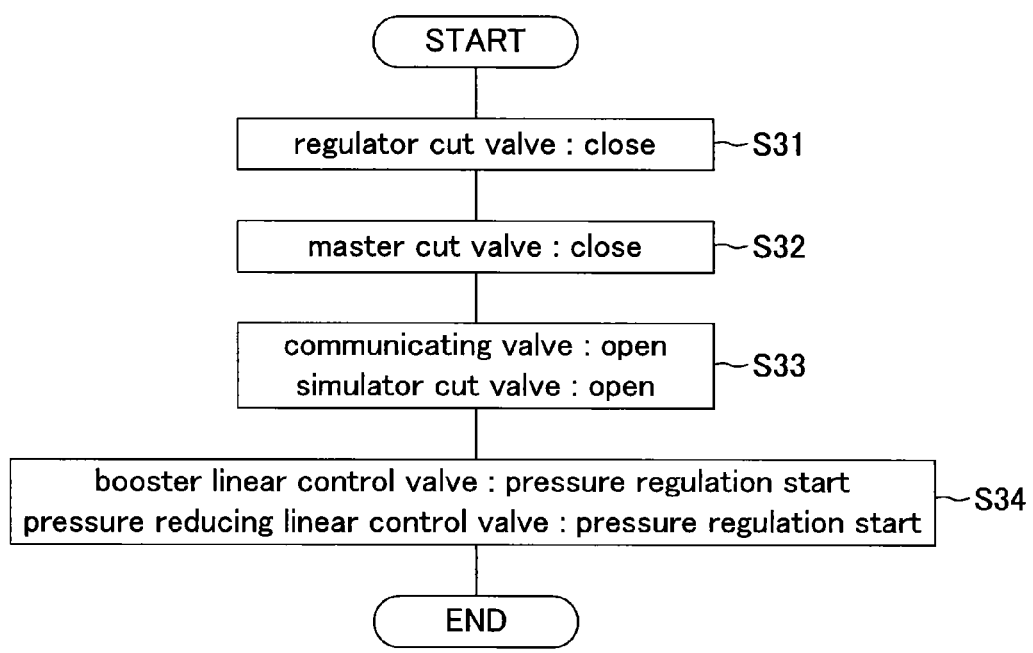
FIG. 6 is a flowchart representing a normal control mode switching routine.

Then, opening and closing timing of the electromagnetic opening and closing valve and the electromagnetic linear control valve when the braking mode is switched to the normal control mode from the depression force fluid pressure mode are described. FIG. 6 represents a normal control mode switching routine performed by the brake ECU 100. Normal control mode switching routine is usually performed when the braking mode is switched to the normal control mode from the depression force fluid pressure mode, that is when it is judged with "Yes" in step S18 of the braking mode setting routine and the braking mode is switched to the normal control mode.

The brake ECU 100 closes the regulator cut valve 66 in step S31. Thereby, the rear wheel depression force fluid pressure circuit LR is cut off. Then subsequently, the brake ECU 100 closes the master cut valve 65 in step S32. Thereby, the front wheel depression force fluid pressure circuit LF is cut off.

Then subsequently, the brake ECU 100 opens the communicating valve 64 and opens the simulator cut valve 72 in step S33. Thereby, the first main flow path 521 communicates with the second main flow path 522. Further, the simulator fluid pressure circuit LS is formed. Then subsequently, the brake ECU 100 starts control for electricity of the booster linear control valve 67 and the pressure reducing linear control valve 68 in step S34. In this way, fluid pressure output by the power fluid pressure generator 30 is regulated by linear control valves 67, 68 and is transmitted to the wheel cylinder 42. After the brake ECU 100 starts control for electricity of linear control valves 67, 68, the normal control mode switching routine is finished.

In the case of switching the braking mode to the normal control mode from the depression force fluid pressure mode, the simulator cut valve 72 is usually opened, but when the simulator cut valve 72 is opened before than the master cut valve 65 is closed, fluid introduced into wheel cylinders 42FR, 42FL of the front wheel, and fluid into the front wheel depression force fluid pressure circuit LF flow into the stroke simulator 70 by difference in pressure. Also, at this time, fluid introduced into wheel cylinders 42RR, 42RL of the rear wheel, and fluid into the rear wheel depression force fluid pressure circuit LR flow into the stroke simulator 70 by difference in pressure, when the communicating valve 64 is at an opened state. Sound is generated by a shock of flowing fluid. Thus, the outbreak of such a sound is prevented by closing the master cut valve 65 before the opening of the simulator cut valve 72.

Note that, when the situation that cannot close the master cut valve 65 before the opening of the simulator cut valve 72 occurs, the communicating valve 64 should be opened after the opening of the simulator cut valve 72. That is, the simulator cut valve 72 should be opened on condition that the communicating valve 64 is at a closed state. In this case, it is possible to prevent fluid introduced into wheel cylinders 42RR, 42RL of the rear wheel, and the rear wheel depression force fluid pressure circuit LR from flowing into the stroke simulator 70.

Further, vehicle speed Vx should be usually detected during execution of the normal control mode switching routine, and in the middle of the normal control mode switching routine (e.g., before practice of step S33), current mode should be usually switched to the simulator non-operation control fluid pressure mode without opening of the simulator cut valve 72 when vehicle speed Vx is beyond zero (when the vehicle begins to run).

Then, constitution to prevent the fluctuation of the braking force at the time of the mode switching is described. In the normal control mode, because fluid pressure of fluid pressurized with the power fluid pressure generator 30 is regulated and is transmitted to the wheel cylinder 42, target braking force depending on the brake pedal operation quantity can be usually set freely. The microcomputer 100a of the brake ECU 100 stores a map representing relations with the quantity of the brake pedal operation (pedal stroke Sp) for executing the normal control mode and the target braking force G * as shown in the solid line of FIG. 7, and calculates the target braking force G * from the brake pedal operation quantity Sp based on these relations in the normal control mode, and regulates fluid pressure so that the target braking force G * is generated. In contrast, in the depression force fluid pressure mode, relations with the brake pedal operation quantity and the braking force are unequivocally decided by machine constitution as shown in broken line of FIG. 7.

Generally it is usually tuned up in the normal control mode so as to generate a big braking force in a smaller stroke than a stroke in the depression force fluid pressure mode, because the target braking force depending on the brake pedal operation quantity can be set freely. Therefore, at the time of the switching the braking mode from the depression force fluid pressure mode to the normal control mode, the braking force fluctuates.

Thus, the brake ECU 100 calculates the target braking force as follows at the switching the braking mode from the depression force fluid pressure mode to the normal control mode. This calculation processing is carried out by performing two calculation routines comprising a stroke correction initial value calculation routine (FIG. 8) and a target braking force calculation routine (FIG. 9).

Figure 8:
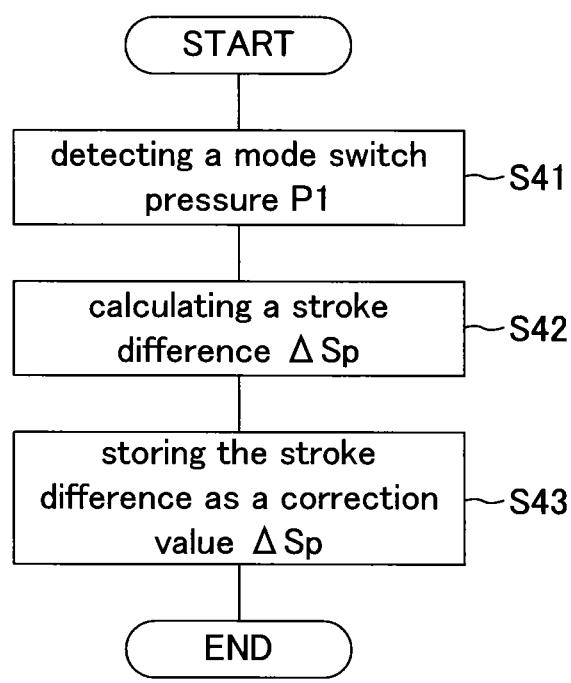
FIG. 8 is a flowchart representing a stroke correction initial value calculation routine.
Figure 9:
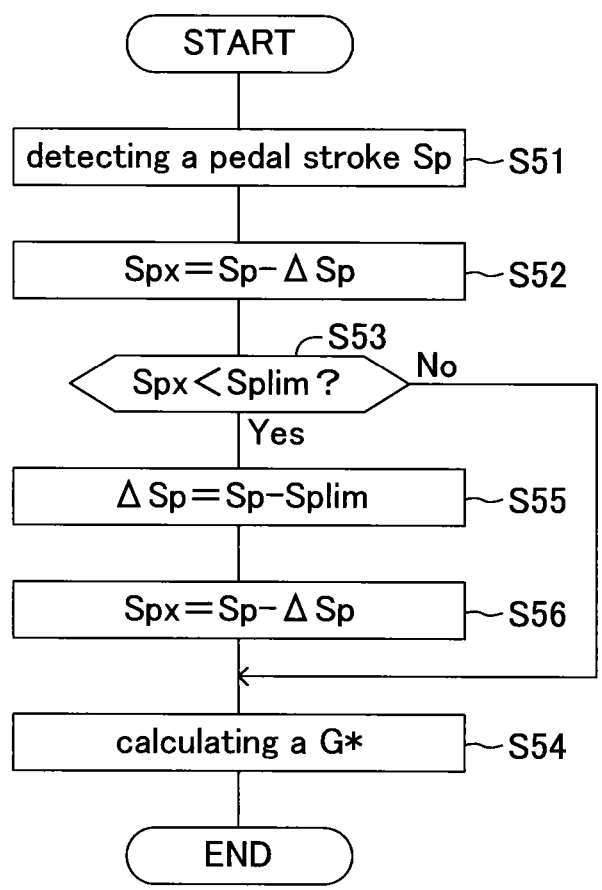
FIG. 9 is a flowchart representing a target braking force calculation routine.

FIG. 8 represents the stroke correction initial value calculation routine. The stroke correction initial value calculation routine is performed just before the switching the braking mode from the depression force fluid pressure mode to the normal control mode. At first, the brake ECU 100 reads control pressure Pcon detected by the control pressure sensor 103 and sets this control pressure Pcon as a mode switch pressure P1 in step S41. This mode switch pressure P1 is fluid pressure working to the wheel cylinder 42 just before the switching the braking mode from the depression force fluid pressure mode to the normal control mode and is corresponding to braking force.

Figure 7:
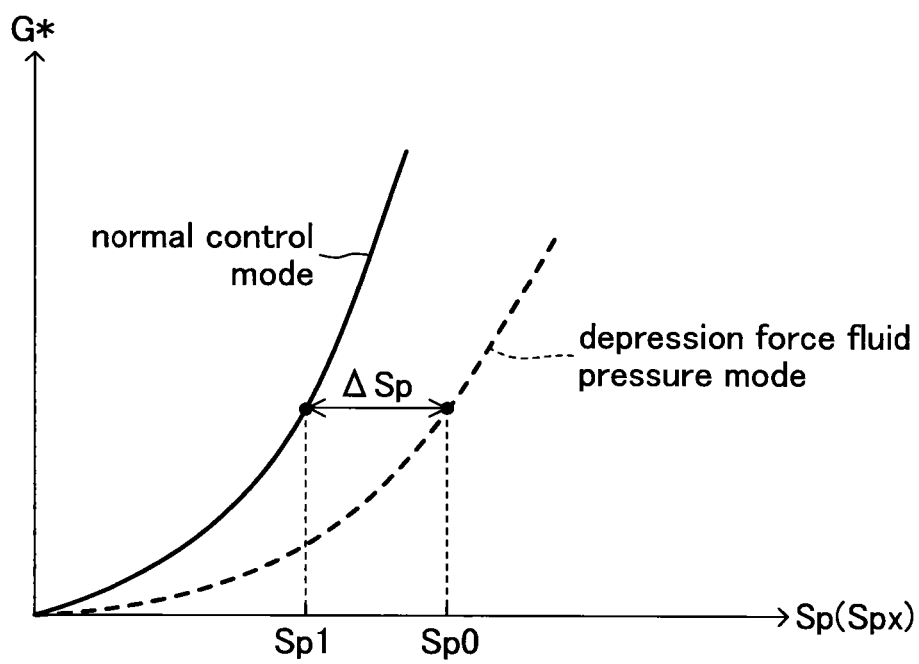
FIG. 7 is a graph representing relations between the brake pedal operation quantity and the target braking force.

Then subsequently, the brake ECU 100 calculates a pedal stroke Sp1 for normal control mode corresponding to the mode switch pressure P1 with reference to the map as shown in the solid line of FIG. 7 in step S42. Then subsequently, the brake ECU 100 calculates a stroke difference $\Delta Sp$ (=Sp0−Sp1) which is difference between a real pedal stroke Sp0 and the pedal stroke Sp1 for the normal control mode. The stroke difference $\Delta Sp$ is a positive value, because it is usually tuned up in the normal control mode so as to generate a big braking force in a smaller stroke than a stroke in the depression force fluid pressure mode.

In this case, the pedal stroke Sp which is detected by the pedal stroke sensor 104 when the control pressure Pcon was detected in step S41 can be set as the real pedal stroke Sp0. Alternatively, a map representing relations with the pedal stroke and the braking force (fluid pressure) as shown in the broken line of FIG. 7 in the depression force fluid pressure mode may be stored in the microcomputer 100a of the brake ECU 100, The pedal stroke to the mode switch pressure P1 may be demanded from this map, and the demanded pedal stroke is set as the real pedal stroke Sp0. In the former case, the brake ECU 100 reads control pressure Pcon in step S41 and should read the pedal stroke Sp detected by the pedal stroke sensor 104.

The brake ECU 100 stores the stroke difference ΔSp as a correction value ΔSp in step S43 and finishes the stroke correction initial value calculation routine.

When the stroke correction initial value calculation routine is finished, the brake ECU 100 starts the target braking force calculation routine shown in FIG. 9 successively. This target braking force calculation routine is started right after the mode was replaced by the normal control mode from the depression force fluid pressure mode and is carried out repeatedly in a scheduled short period.

At first, the brake ECU 100 reads the pedal stroke Sp (referred to as a detection stroke Sp) detected by pedal stroke sensor 104 in step S51. Then subsequently, a correction (corrected) stroke Spx (=Sp–ΔSp) which is the value that the correction value ΔSp is subtracted from the detection stroke Sp is calculated in step S52.

Then subsequently, the brake ECU 100 determines in step S53 whether the correction stroke Spx is smaller than the lower limit stroke Splim or not and can go ahead through the processing to step S54 when the correction stroke Spx is more than the lower limit stroke Splim (S53: No). The brake ECU 100 calculates the target braking force G * to the correction stroke Spx with reference to the map (solid line) shown in FIG. 7 in step S54.

After the brake ECU 100 calculates the target braking force G * in step S54, the target braking force calculation routine is finished. The target braking force calculation routine is repeated in a scheduled short period. Therefore, the target braking force G * is calculated repeatedly using the correction stroke Spx which is the value that the correction value ΔSp was subtracted from the detection stroke Sp.

Figure 10:
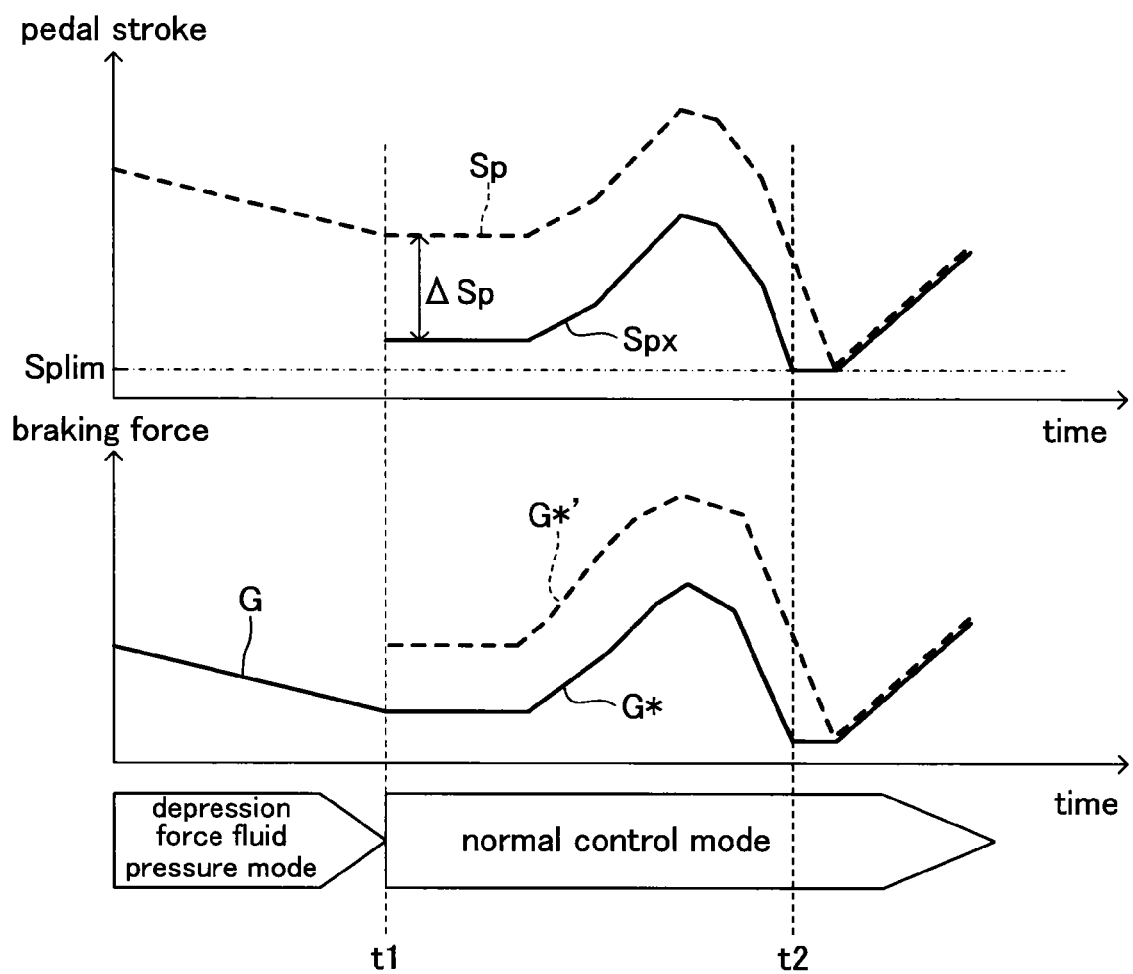
FIG. 10 is a graph representing changes of the pedal stroke and the braking force.

FIG. 10 represents the transition of the pedal stroke (the upper section) and the braking force (the lower section) at the time of the mode switching. In the figure, time t1 represents the time to be replaced by the normal control mode from the depression force fluid pressure mode. In the graph of the upper section, the solid line represents the correction stroke Spx, and the broken line represents the detection stroke Sp which is a real pedal stroke. In the graph of the lower section, the solid line on the later time than time t1 represents the target braking force G * calculated by the correction stroke Spx, and the solid line on the time previous than time t1 represents the braking force G which is really generated in the depression force fluid pressure mode, and the broken line represents the target braking force G *' calculated by the detection stroke Sp.

As shown in FIG. 10, on the time previous than time t1 the braking force G depending on the detection stroke Sp is generated. After the mode is replaced by the normal control mode from the depression force fluid pressure mode by the returning operation of the brake pedal 10 (time t1), thereafter, the target braking force G * depending on the correction stroke Spx set to be smaller than the detection stroke Sp about the correction value ΔSp is set. Therefore, characteristics between the pedal stroke and the braking force are maintained even if the mode is replaced by the normal control mode from the depression force fluid pressure mode. As a result, the fluctuation of the braking force at the time of the mode switching does not occur.

After repeating such a processing, when the brake ECU 100 detects that the correction stroke Spx is smaller than the lower limit stroke Splim in step S53, the brake ECU 100 updates the correction value ΔSp in step S55. In this case, the brake ECU 100 sets the value that the lower limit stroke Splim is subtracted from the detection stroke Sp as a new correction value ΔSp (ΔSp=Sp–Splim).

Then subsequently, in step S56, the brake ECU 100 calculates the correction stroke Spx (=Sp–ΔSp) using the correction value ΔSp set newly by subtracting the correction value ΔSp from the detection stroke Sp. Thereby, the correction stroke Spx does not come to be smaller than the lower limit stroke Splim. The brake ECU 100 processes above-mentioned step S54 after calculating the correction stroke Spx in step S56.

Here, reason why steps S53-S56 are processed is described. The correction stroke Spx set to be smaller than the detection stroke Sp about the correction value ΔSp. Therefore, the correction stroke Spx may become a value smaller than the value within the stroke range of the brake pedal 10. Therefore, the lower limit stroke Splim is set so that the correction stroke Spx is within the stroke range of the brake pedal 10. In this embodiment, the lower limit stroke Splim is set to the stroke that a braking judgment is established, namely the smallest stroke that the brake pedal operation is detected.

Figure 11:
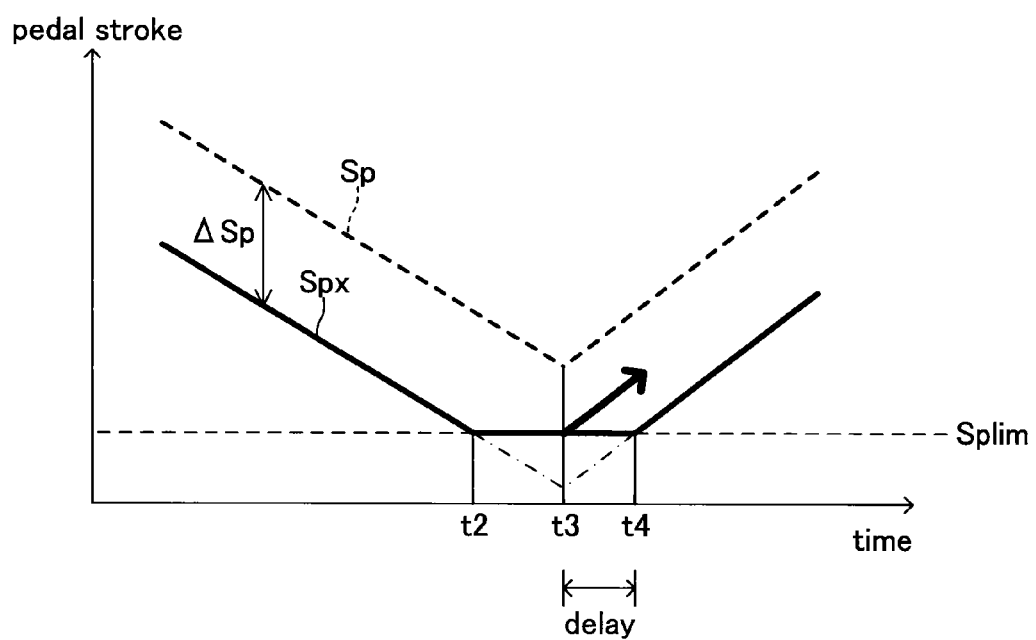
FIG. 11 is a graph representing relations between the detected stroke and the corrected stroke.

However, in the fixed state of the correction value ΔSp, the correction stroke Spx is merely set in the lower limit stroke Splim when the correction stroke Spx is smaller than the lower limit stroke Splim, then when the brake pedal 10 is stepped (at increasing the pedal stroke), the start of the braking force may be late (delay). For example, when the correction stroke Spx is smaller than the lower limit stroke Splim at time t2 by return the operation of the brake pedal 10 as shown in FIG. 11, the correction stroke Spx is maintained at the lower limit stroke Splim after time t2. However, then the correction stroke Spx is maintained at the lower limit stroke Splim while the calculated correction stroke Spx does not exceed the lower limit stroke Splim even if the brake pedal 10 is stepped at time t3. Therefore, the braking forces do not increase until time t4 that the correction stroke Spx becomes more than the lower limit stroke Splim.

Thus, in this embodiment, the correction value ΔSp is updated sequentially in step S55 when the correction stroke Spx is smaller than the lower limit stroke Splim. In this case, the brake ECU 100 updates the correction value ΔSp in the value that the lower limit stroke Splim is subtracted from the detection stroke Sp. Thereby, when the brake pedal operation quantity increases even if it is on condition that the lower limit value of the correction stroke Spx is limited, the correction stroke Spx can be increased from the point in time as the arrow shown in FIG. 11. As a result, the target braking force G * can be increased immediately by synchronizing with the pedal operation.

Note that, the pedal stroke Sp is used in the stroke correction initial value calculation routine and the target braking force calculation routine of the present embodiment, but fluid pressure of fluid can be used replacing with the pedal stroke Sp. In this case, the regulator pressure Preg detected by the regulator pressure sensor 102 as the brake pedal operation quantity should be used. Also, the fluid pressure difference ΔP should be used as the correction value. For example, the initial value of the correction value should be calculated based on a difference with the mode switch pressure P1 which is the fluid pressure just before the switching the braking mode from the depression force fluid pressure mode to the normal control mode and the fluid pressure corresponding to the target force G * (referring to the solid line map in FIG. 7) calculated by the pedal stroke Sp in the point in time.

According to the brake control device of the present embodiment described as things mentioned above, it can be prevented that uncomfortable feeling is given to a driver even if the operation of the stroke simulator 70 is started, because the depression force fluid pressure mode is executed at the rapid startup, and the depression force fluid pressure mode is switched to the normal control mode in the middle of the returning operation of the brake pedal 10. Further, a mode switching timing can be set appropriately, because when the control pressure Pcon became smaller than the switching determination threshold value P0, the depression force fluid pressure mode is switched to the normal control mode by a judgment that there is in the middle of the returning operation of the brake pedal 10. As a result of these, the brake operation feeling at the rapid startup can be improved.

Further, during the practice of the depression force fluid pressure mode, the desired braking force can be generated immediately, because the simulator non-operation control fluid pressure mode is executed at the time of the run start of the vehicle (Vx>0), even if the returning operation of the brake pedal 10 is not carried out.

Further, when the depression force fluid pressure mode is switched to the normal control mode, the correction value ΔSp to revise relations with the pedal stroke Sp which is the quantity of the pedal operation and the target braking force G * is calculated based on pressure P1 just before the switch of the mode, and the target braking force G * is calculated based on the correction stroke Spx which is the correction value of the pedal stroke Sp by this correction value ΔSp. Therefore, the switch of the braking force can be inhibited, when the depression force fluid pressure mode is switched to the normal control mode.

Further, It is possible to prevent generation of the braking force from being late to the brake pedal operation, because the correction value ΔSp is updated so that the correction stroke Spx is not smaller than the predetermined lower limit stroke Splim.

Because the master cut valve 65 is closed before the opening of the simulator cut valve 72 when the depression force fluid pressure mode is switched to the normal control mode, a large quantity of fluid does not come to flow into the stroke simulator 70, it is possible to reduce the outbreak of the sound by the inflow of fluid.

Figure 12:
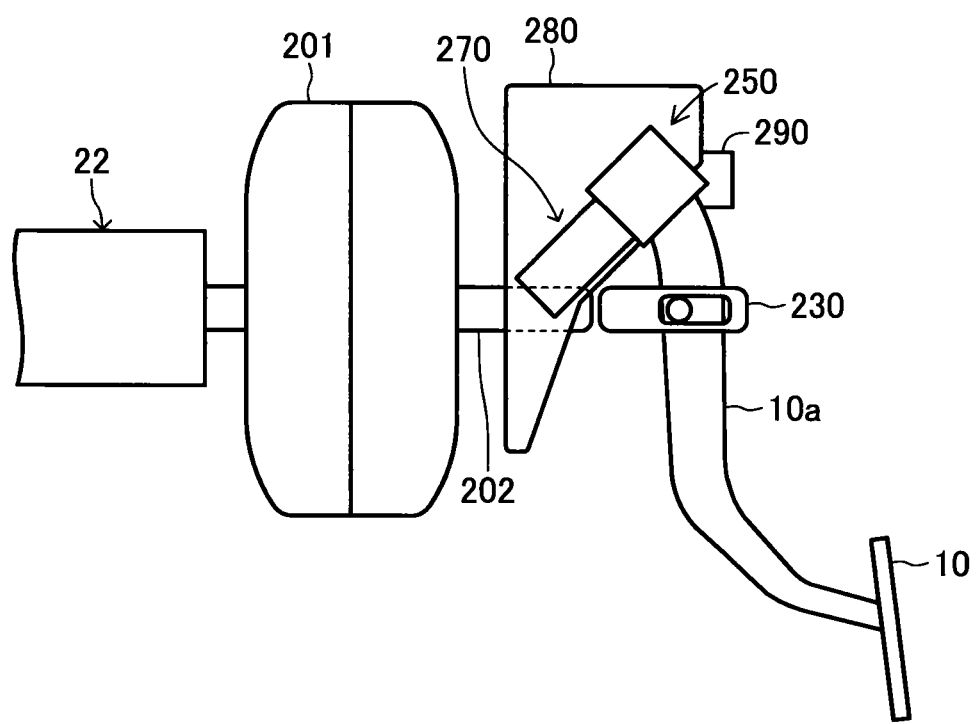
FIG. 12 is an illustration of outline constitution of a pedal depression force input of a brake control device as the variation.
Figure 13:
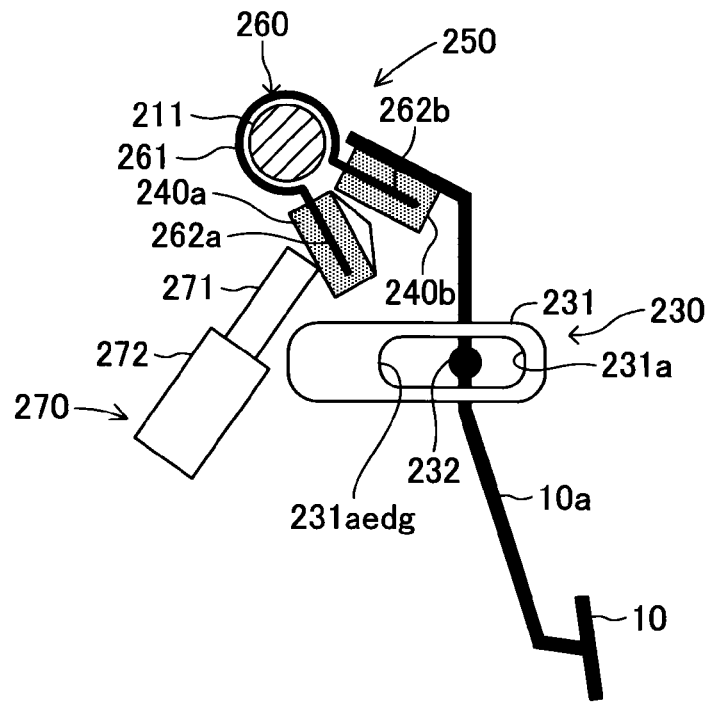
FIG. 13 is an operation illustration in the normal control mode of the stroke simulator of the variation.
Figure 14:
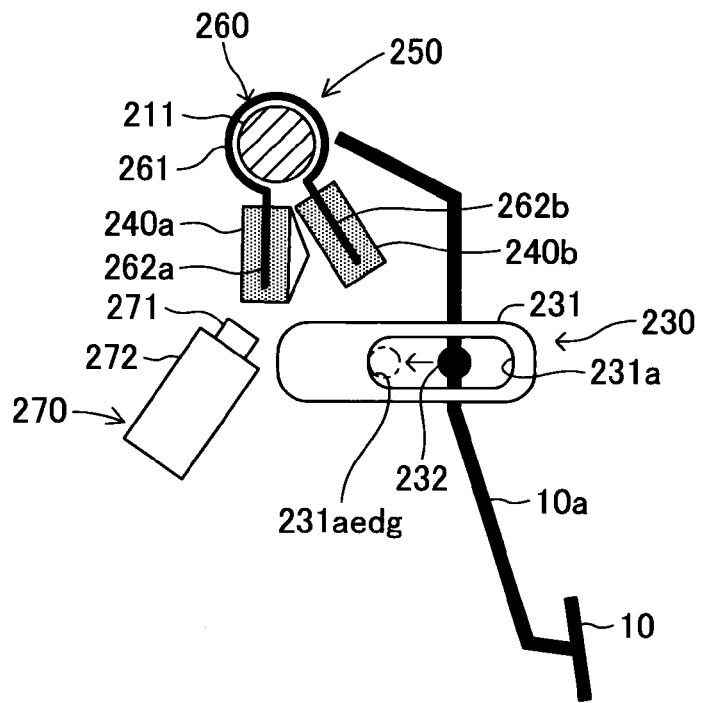
FIG. 14 is an operation illustration in the depression force fluid pressure mode of the stroke simulator of the variation.

Then, the variation of the stroke simulator is described using FIGS. 12-14. The stroke simulator 70 of the embodiment introduces fluid of the quantity depending on the brake pedal operation quantity inside and enables the stroke operation of the brake pedal 10 and generates the anti-power responding to the pedal operation quantity, but the stroke simulator according to this variation does not comprise the fluid pressure-type stroke simulator 70, the simulator flow path 71 and the simulator cut valve 72, and fluid is not introduce into the stroke simulator.

The brake control device according to this variation comprises a negative pressure booster 201 as shown in FIG. 12, and the pedal depression force input into the brake pedal 10 is transmitted to the master cylinder 22 by encouragement of the negative pressure booster 201. The pedal arm 10a which supports the brake pedal 10 so that this pedal becomes able to swing comprises an estrangement clevis 230, and the pedal depression force is transmitted to a push rod 202 of the negative pressure booster 201 through this estrangement clevis 230.

The estrangement clevis 230 comprises a depression force transmission member 231 having an elongated hole 231a and a pin member 232 which is adhered to the pedal arm 10a, and wherein its tip is inserted into the elongated hole 231a as shown in FIGS. 13, 14. The pin member 232 is constructed so that it becomes able to move to the longer axis direction of the elongated hole 231a, and moves in the elongated hole 231a by swing of the pedal arm 10a. On condition that the pin member 232 does not abut with an end 231aedg of the elongated hole 231a, the pedal depression force is not transmitted to the depression force transmission member 231. When the pedal arm 10a is stepped and further swing from the condition that the pin member 232 abutted with the end 231aedg of the elongated hole 231a, the pin member 232 and the depression force transmission member 231 moves in one body, and the push rod 202 is pushed by pedal depression force.

An end of the pedal arm 10a comprises a stroke simulator 250 of the machine spring type. The stroke simulator 250 comprises a leaf spring 260 which is attached swingably to a fix axis 211 fixed to a mounting frame 280 and rubber members 240a, 240b attached to both ends of the leaf spring 260.

The leaf spring 260 is a V-shaped strip and includes a plate part 261 which curved into a cylinder form and rubber mounting plate parts 262a, 262b which spread from both sides of the plate region 261. The plate part 261 is mounted to the fix axis 211 swingably so that its internal perimeter surface covers the outer peripheral surface of the fix axis 211. Rubber members 240a, 240b are put on rubber mounting plate parts 262a, 262b in a state facing each other, respectively.

A push solenoid 270 is fixed to the mounting frame 280 below the leaf spring 260. The push solenoid 270 is connected to the brake ECU 100, and is controlled so as to maintain the push rod 271 at the position that advanced from the body section 272 when the solenoid drive signal is supplied from the brake ECU 100, and is controlled so as to maintain the push rod 271 at the position that retreated to the direction of the body section 272 when the solenoid drive signal is not supplied.

When the push rod 271 of the push solenoid 270 becomes in condition to have advanced, the stroke simulator 250 is supported to the push rod 271 as shown in FIG. 13. In this condition, the stroke simulator 250 is sandwiched between the tip of the push rod 271 and the base end of the pedal arm 10a. Therefore, when the driver steps with brake pedal 10, rubber mounting plate parts 262a, 262b of the stroke simulator 250 are biased in the direction (the direction that a V-shaped angle of the leaf spring 260 gets narrow) to approach each other by the depression force. Thereby, the leaf spring 260 transforms and compresses two rubber members 240a, 240b. Therefore, the power of restitution by the leaf spring 260 and rubber members 240a, 240b occurs as anti-power to the pedal operation.

In this case, because brake pedal 10 is thrown up by anti-power of the stroke simulator 250, the pin member 232 of the estrangement clevis 230 does not move to the end 231aedg of the elongated hole. Therefore, the depression force transmission member 231 does not push the push rod 202 of the negative pressure booster 201; the pedal depression force is not transmitted to the master cylinder 22 side.

Also, on condition that the push rod 271 of the push solenoid 270 retreated, the stroke simulator 250 loses a support with the push rod 271 as shown in FIG. 14, and rotates around the fixe axis 211 in the clockwise direction of the figure, and is maintained at the stable position by self-respect. In this condition, the stroke simulator 250 is in a free condition from the push rod 271 and the pedal arm 10a. Therefore, when the driver steps with the brake pedal 10, and the stroke simulator 250 does not operate either, and the pedal arm 10a swings in the clockwise direction of the figure. Thereby, after the pin member 232 of the estrangement clevis 230 moves to the end 231aedg of the elongated hole 231a, and the pin member 232 reached the end 231aedg, the depression force transmission member 231 is united with the pin member 232 and pushes the push rod 202 of the negative pressure booster 201 to the left direction of the figure. Thereby, the pedal depression force is transmitted to the master cylinder 22.

Therefore, the estrangement clevis 230 acts as a depression force transmission changing mechanism which is configured that the pedal depression force is not transmitted to the master cylinder 22 when the stroke simulator 250 operated, and the pedal depression force is transmitted to the master cylinder 22 when the stroke simulator 250 does not operate. Also, the push solenoid 270 acts as a stroke simulator operation changing mechanism to change the state of stroke simulator 250 to an active state (state to generate anti-power) and an inactive state (state not to generate anti-power).

The pedal arm 10a comprises a pedal angle sensor 290 for detecting the stamp-in angle of the brake pedal 10. The pedal angle sensor 290 outputs a detection signal representing the stamp-in angle (referring to as pedal angle θp) of the brake pedal 10 to the brake ECU 100.

The brake ECU 100 drives the push solenoid 270 and operates the stroke simulator 250 in the normal control mode. When the brake ECU 100 does not start, an electric current is not sent to the push solenoid 270. Therefore, at the rapid startup, the push rod 202 of the negative pressure booster 201 is pushed by stepping forward operation of the brake pedal 10, and fluid pressure acts on the wheel cylinder 42 through depression force fluid pressure circuits LR, LR. After the rapid startup, when the pedal angle θp detected by the pedal angle sensor 290 is smaller than a predetermined switching determination threshold value θp, the brake ECU 100 determines that the returning operation of the brake pedal 10 was performed and replaces by the normal control mode from the depression force fluid pressure mode. Thereby, the fluid pressure control circuit LC is formed in place of depression force fluid pressure circuits LR, LR, and fluid pressure output by the power fluid pressure generator 30 is regulated by the booster linear control valve 67 and the pressure reducing linear control valve 68 and is transmitted to the wheel cylinder 42 of four wheels. In this case, the brake ECU 100 supplies the solenoid drive signal to the push solenoid 270 and advances the push rod 271. Thereby, it is replaced by the state that the stroke simulator 250 can operate.

An operation timing of the stroke simulator 250 after the rapid startup that is a drive timing of the push solenoid 270, is should be same as a timing of the simulator cut valve 72 in the embodiment.

In this variation, the pedal operation feeling at the rapid startup can be improved like the embodiment. Note that, in this variation, the pedal angle θp detected by the pedal angle sensor 290 is used for the brake pedal operation quantity, but the pedal stroke Sp and the fluid pressure of fluid may be used like the embodiment.

The brake control device of the present embodiment and its variation are described as mentioned above, but the present invention is not limited to the embodiment and the variation, and various kinds of changes are possible without departing from the object of the invention.

For example, the brake control device of the present embodiment applied to a hybrid vehicle, but the brake control device may be applied to an electric car (EV). Even, in this case, the regenerative cooperation brake control can be performed.

Also, in this embodiment, it was determined based on control pressure Pcon that the brake pedal operation was in the middle of going back up, but it may be judged that the brake pedal operation is in the middle of going back up when the pedal stroke Sp detected by pedal stroke sensor 104 is smaller than the switching determination threshold value Sp0.

Also, in this embodiment, it is changed to the a simulator non-operation control fluid pressure mode when the vehicle speed Vx increased than zero after the rapid startup (S19), but the vehicle speed Vx0 bigger than zero is set, and it may be changed to the a simulator non-operation control fluid pressure mode when the vehicle speed Vx increased than the set vehicle speed Vx0. Also, it is not necessary that the timing to change to the a simulator non-operation control fluid pressure mode is based on the vehicle speed Vx, but the timing should set in a timing when the braking control such as the regenerative cooperation brake control, the hill start assist control, the ABS control is necessary.

Also, in this embodiment, in the stroke correction initial value calculation routine, the stroke difference ΔSp between the real pedal stroke Sp0 and the pedal stroke Sp1 for the normal control is set as the correction initial value, but it is not necessarily had to set in this value and the value depending on the stroke difference ΔSp, e.g., the value that multiplied an adjustment coefficient by the stroke difference ΔS may be used as the correction initial value.

Also, in this embodiment, it is applied to the brake control device controlling four wheel cylinder pressures in being common by linear control valves comprising the booster linear control valve 67 and the pressure reducing linear control valve 68, but it is applied to the brake control device in which the separate linear control valves are provided to the fluid pressure control circuit every four of them and fluid pressure of fluid pressurized in the power fluid pressure generator is regulated by each linear control valve every each wheel may transmit to the wheel cylinder.

The invention claimed is:
1. A brake control device, comprising:
a plurality of wheel cylinders in which each wheel cylinder is provided to each of a plurality of wheels respectively and receives a fluid pressure of fluid and provides a braking force to each wheel,
a depression force fluid pressure circuit which transmits the fluid pressure of fluid pressurized by pedal force input into a brake pedal to a plurality of wheel cylinders,
a power fluid pressure generator to pressurize fluid regardless of an operation of the brake pedal,
a fluid pressure control circuit which regulates fluid pressure of fluid pressurized by the power fluid pressure generator and transmits fluid pressure to a plurality of wheel cylinders,
a stroke simulator which generates an anti-power depending on an operation quantity of the brake pedal operation and permits the brake pedal operation,
an electronic control device which executes a normal control mode for generating a braking force depending on the brake pedal operation quantity using the fluid pressure control circuit while operating the stroke simulator and a depression force fluid pressure mode for generating a braking force using the depression force fluid pressure circuit while stopping the stroke simulator selectively,
a rapid startup means for starting the electronic control device by the brake pedal operation when a vehicle ignition is off,
further comprising a rapid startup mode switching control means for switching a braking mode from the depression force fluid pressure mode to the normal control mode in a middle of a returning operation of the brake pedal when the electronic control device starts by the rapid startup means.

2. A brake control device according to claim 1,
wherein the rapid startup mode switching control means switches a braking mode from the depression force fluid pressure mode to the normal control mode when the electronic control device started by the rapid startup means, and the operation quantity of the brake pedal decreases from a predetermined switching determination threshold value.

3. A brake control device according to claim 1, further comprising:
a simulator non-operation control fluid pressure mode executing means to execute a simulator non-operation control fluid pressure mode for generating a braking force using the fluid pressure control circuit in a state of stopping a function of the stroke simulator when a predetermined control fluid pressure requirement condition is satisfied even when the returning operation of the brake pedal is not carried out after starting the electronic control device by the rapid startup means.

4. A brake control device according to claim 3,
wherein the control fluid pressure requirement condition is a condition in which vehicle speed is beyond a predetermined setting speed.

5. A brake control device according to claim 1, further comprising:
a target braking force calculation means which calculates a correction quantity for correcting of relations with a brake pedal operation quantity and a target braking force after the switch to the normal control mode based on a real braking force generated by the depression force fluid pressure circuit in the case of switching the braking mode from the depression force fluid pressure mode to the normal control mode, and calculates the target braking force based on the correction quantity.

6. A brake control device according to claim 5,
wherein the target braking force calculation means corrects the brake pedal operation quantity using the correction quantity,
the brake control device further comprises a correction quantity update means for updating the correction quantity so that the corrected brake pedal operation quantity is not smaller than a predetermined lower limit value.

7. A brake control device according to claim 1,
wherein the stroke simulator is connected to a simulator flow path branched from a point of the power fluid pressure generator side of the fluid pressure control circuit from a depression force cutoff valve for opening and closing the fluid pressure control circuit and introduces fluid of the quantity depending on the brake pedal operation quantity and generates the anti-power on condition that a simulator opening and closing valve provided in the simulator flow path is at an opened state,
the brake control device further comprises a valve operation timing setting means for opening the simulator opening and closing valve on condition that a valve provided in a point of the wheel cylinder side of the fluid pressure control circuit from the branch point of the simulator flow path is at a closed state in the case of switching the braking mode from the depression force fluid pressure mode to the normal control mode.

8. A brake control device, comprising:
a plurality of wheel cylinders in which each wheel cylinder is provided to each of a plurality of wheels respectively and receives a fluid pressure of fluid and provides a braking force to each wheel;
a depression force fluid pressure circuit which transmits the fluid pressure of fluid pressurized by pedal force input into a brake pedal to a plurality of wheel cylinders;
a power fluid pressure generator to pressurize fluid regardless of an operation of the brake pedal;
a fluid pressure control circuit which regulates fluid pressure of fluid pressurized by the power fluid pressure generator and transmits fluid pressure to a plurality of wheel cylinders;
a stroke simulator which generates an anti-power depending on an operation quantity of the brake pedal operation and permits the brake pedal operation;
an electronic control device which executes a normal control mode for generating a braking force depending on the brake pedal operation quantity using the fluid pressure control circuit while operating the stroke simulator and a depression force fluid pressure mode for generating a braking force using the depression force fluid pressure circuit while stopping the stroke simulator selectively; and
circuitry configured to start the electronic control device by the brake pedal operation when a vehicle ignition is off,
the electronic control device configured to switch a braking mode from the depression force fluid pressure mode to the normal control mode in a middle of a returning operation of the brake pedal when the electronic control device starts by the circuitry.

9. A brake control device according to claim 8,
wherein the electronic control device is configured to switch a braking mode from the depression force fluid pressure mode to the normal control mode when the electronic control device is started by the circuitry, and the operation quantity of the brake pedal decreases from a predetermined switching determination threshold value.

10. A brake control device according to claim 8,
wherein the electronic control device is configured to execute a simulator non-operation control fluid pressure mode for generating a braking force using the fluid pressure control circuit in a state of stopping a function of the stroke simulator when a predetermined control fluid pressure requirement condition is satisfied even when the returning operation of the brake pedal is not carried out after starting the electronic control device by the circuitry.

11. A brake control device according to claim 10,
wherein the control fluid pressure requirement condition is a condition in which vehicle speed is beyond a predetermined setting speed.

12. A brake control device according to claim 8,
wherein the electronic control device is configured to calculate a correction quantity for correcting of relations with a brake pedal operation quantity and a target braking force after the switch to the normal control mode based on a real braking force generated by the depression force fluid pressure circuit in the case of switching the braking mode from the depression force fluid pressure mode to the normal control mode, and to calculate the target braking force based on the correction quantity.

13. A brake control device according to claim 12,
wherein the electronic control device is configured to correct the brake pedal operation quantity using the correction quantity, and to update the correction quantity so that the corrected brake pedal operation quantity is not smaller than a predetermined lower limit value.

14. A brake control device according to claim 8,
wherein the stroke simulator is connected to a simulator flow path branched from a point of the power fluid pressure generator side of the fluid pressure control circuit from a depression force cutoff valve for opening and closing the fluid pressure control circuit and introduces fluid of the quantity depending on the brake pedal operation quantity and generates the anti-power on condition that a simulator opening and closing valve provided in the simulator flow path is at an opened state, and
the electronic control device is configured to open the simulator opening and closing valve on condition that a valve provided in a point of the wheel cylinder side of the fluid pressure control circuit from the branch point of the simulator flow path is at a closed state in the case of switching the braking mode from the depression force fluid pressure mode to the normal control mode.

15. A brake control device according to claim 8,
wherein the circuitry configured to start the electronic control device by the brake pedal operation when the vehicle ignition is off includes a brake pedal switch.

16. A brake control device, comprising:
a plurality of wheel cylinders in which each wheel cylinder is provided to each of a plurality of wheels respectively and receives a fluid pressure of fluid and provides a braking force to each wheel;
a depression force fluid pressure circuit which transmits the fluid pressure of fluid pressurized by pedal force input into a brake pedal to a plurality of wheel cylinders;
a power fluid pressure generator to pressurize fluid regardless of an operation of the brake pedal;
a fluid pressure control circuit which regulates fluid pressure of fluid pressurized by the power fluid pressure generator and transmits fluid pressure to a plurality of wheel cylinders;
a stroke simulator which generates an anti-power depending on an operation quantity of the brake pedal operation and permits the brake pedal operation;
an electronic control device which executes a normal control mode for generating a braking force depending on the brake pedal operation quantity using the fluid pressure control circuit while operating the stroke simulator and a depression force fluid pressure mode for generating a braking force using the depression force fluid pressure circuit while stopping the stroke simulator selectively; and
circuitry configured to start the electronic control device by the brake pedal operation,
the electronic control device configured to switch a braking mode from the depression force fluid pressure mode to the normal control mode in a middle of a returning operation of the brake pedal when the electronic control device starts by the circuitry, and
the electronic control device is configured to execute a simulator non-operation control fluid pressure mode for generating a braking force using the fluid pressure control circuit in a state of stopping a function of the stroke simulator when a predetermined control fluid pressure requirement condition is satisfied even when the returning operation of the brake pedal is not carried out after starting the electronic control device by the circuitry.

* * * * *